(12) United States Patent
Hirata et al.

(10) Patent No.: US 10,787,541 B2
(45) Date of Patent: Sep. 29, 2020

(54) POLYCARBONATE RESIN, METHOD FOR PRODUCING POLYCARBONATE RESIN, COATING LIQUID, ELECTROPHOTOGRAPHIC PHOTORECEPTOR, AND ELECTROPHOTOGRAPHY DEVICE

(71) Applicant: IDEMITSU KOSAN CO., LTD., Tokyo (JP)

(72) Inventors: Kengo Hirata, Sodegaura (JP); Takaaki Hikosaka, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/085,459

(22) PCT Filed: Mar. 15, 2017

(86) PCT No.: PCT/JP2017/010365
§ 371 (c)(1),
(2) Date: Sep. 14, 2018

(87) PCT Pub. No.: WO2017/159727
PCT Pub. Date: Sep. 21, 2017

(65) Prior Publication Data
US 2019/0085120 A1    Mar. 21, 2019

(30) Foreign Application Priority Data

Mar. 15, 2016 (JP) .................. 2016-051723

(51) Int. Cl.
| C08G 64/06 | (2006.01) |
| C08G 64/20 | (2006.01) |
| C08G 64/24 | (2006.01) |
| G03G 5/05 | (2006.01) |
| C08J 3/07 | (2006.01) |
| C09D 169/00 | (2006.01) |
| G03G 5/07 | (2006.01) |

(52) U.S. Cl.
CPC ............ *C08G 64/06* (2013.01); *C08G 64/20* (2013.01); *C08G 64/24* (2013.01); *C08J 3/07* (2013.01); *C09D 169/00* (2013.01); *G03G 5/05* (2013.01); *G03G 5/0564* (2013.01); *G03G 5/07* (2013.01)

(58) Field of Classification Search
USPC ....................................................... 528/201
See application file for complete search history.

(56) References Cited

U.S. PATENT DOCUMENTS

| 7,563,858 | B2 | 7/2009 | Kakihara et al. |
| 9,188,887 | B2 | 11/2015 | Hirata et al. |
| 2008/0255324 | A1 | 10/2008 | Kakihara et al. |
| 2013/0337373 | A1 | 12/2013 | Hirata et al. |

FOREIGN PATENT DOCUMENTS

| CN | 103391958 A | 11/2013 |
| JP | H6-136109 A | 5/1994 |
| JP | H6-228300 A | 8/1994 |
| JP | H6-234845 A | 8/1994 |
| JP | H6-329786 A | 11/1994 |
| JP | H7-26010 A | 1/1995 |
| JP | H09-67445 A | 3/1997 |
| JP | H10-130384 A | 5/1998 |
| JP | H11-172003 A | 6/1999 |
| JP | H11 199664 A | 7/1999 |
| JP | 2002-241484 A | 8/2002 |
| JP | 2003-34723 A | 2/2003 |
| JP | 2005-82677 A | 3/2005 |
| JP | 2005-139339 A | 6/2005 |
| JP | 2005-336332 A | 12/2005 |
| JP | 2006-267886 A | 10/2006 |
| JP | 2008-106214 A | 5/2008 |
| JP | 2008-121009 A | 5/2008 |
| JP | 2012-051983 A | 3/2012 |
| JP | 201251983 A | 3/2012 |
| JP | 2012-162048 A | 8/2012 |
| JP | 2012-185206 A | 9/2012 |
| JP | 2012-214774 A | 11/2012 |
| JP | 2015-67687 A | 4/2015 |
| JP | 2015-169800 A | 9/2015 |
| WO | 2005121212 A1 | 12/2005 |
| WO | 2012115088 A1 | 8/2012 |

OTHER PUBLICATIONS

International Search Report for PCT/JP2017/010365 dated May 9, 2017.
English Abstract for JP2012501983, Publication Date: Mar. 15, 2012.
English Abstract for JPH10130384, Publication Date: May 19, 1998.
English Abstract for JPH11199664, Publication Date: Jul. 27, 1999.
English Abstract for JP2005082677, Publication Date: Mar. 31, 2005.
English Abstract for JP2008106214, Publication Date: May 8, 2008.
English Abstract for JPH06136109, Publication Date: May 17, 1994.

(Continued)

*Primary Examiner* — Terressa Boykin
(74) *Attorney, Agent, or Firm* — Millen White Zelano and Branigan, PC; John Sopp

(57) ABSTRACT

A polycarbonate resin has a structure represented by a formula (1) and a yellow index (YI) of 30 or less in a solid form,

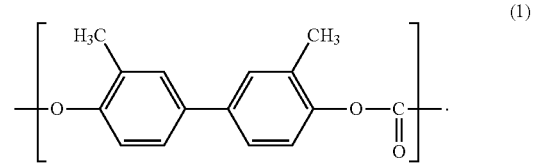

18 Claims, No Drawings

(56) References Cited

OTHER PUBLICATIONS

English Abstract of JPH06228300, Publication Date: Aug. 16, 1994.
English Abstract of JPH06234845, Publication Date: Aug. 23, 1994.
English Abstract of JPH06329786, Publication Date: Nov. 29, 1994.
English Abstract of JPH0726010, Publication Date: Jan. 27, 1995.
English Abstract of JPH0967445, Publication Date: Mar. 11, 1997.
English Abstract of JP2002241484, Publication Date: Aug. 28, 2002.
English Abstract of JP2003034723, Publication Date: Feb. 7, 2003.
English Abstract of JP2005336332, Publication Date: Dec. 8, 2005.
English Abstract of JP2006267886, Publication Date: Oct. 5, 2006.
English Abstract of JP2008121009, Publication Date: May 29, 2008.
English Abstract of JP2012162048, Publication Date: Aug. 30, 2012.
English Abstract of JP2012185206, Publication Date: Sep. 27, 2012.
English Abstract of JP2012214774, Publication Date: Nov. 8, 2012.
English Abstract of JP2015067687, Publication Date: Apr. 13, 2015.
English Abstract of JP2015169800, Publication Date: Sep. 28, 2015.
Office Action issued in corresponding Chinese patent application No. 201780017485.7 dated Jul. 28, 2020 (pp. 1-10).

POLYCARBONATE RESIN, METHOD FOR PRODUCING POLYCARBONATE RESIN, COATING LIQUID, ELECTROPHOTOGRAPHIC PHOTORECEPTOR, AND ELECTROPHOTOGRAPHY DEVICE

TECHNICAL FIELD

The present invention relates to a polycarbonate resin, a method of producing the polycarbonate resin, a coating liquid, an electrophotographic photoreceptor, and an electrophotography device.

BACKGROUND ART

A polycarbonate resin is used for various purposes in view of excellent mechanical characteristics, transparency and the like thereof.

For instance, a polycarbonate resin made from 3,3'-dimethyl-4,4'-dihydroxybiphenyl (hereinafter, occasionally abbreviated as "OCBP") exhibits an excellent wear resistance, a low gas permeability, a high surface hardness and the like.

Patent Literature 1 discloses that a polycarbonate resin is favorably usable as an electrophotographic photoreceptor.

CITATION LIST

Patent Literature(s)

Patent Literature 1: JP 2012-51983 A

SUMMARY OF THE INVENTION

Problem(s) to be Solved by the Invention

When OCBP is used as a raw material for a polycarbonate resin, the OCBP reacts with oxygen under alkaline conditions during polymerization to change into quinone, so that the obtained polycarbonate resin is adversely colored in yellow to brown. Since the colored polycarbonate resin is usable only for limited purposes, a less colored polycarbonate resin has been desired.

An object of the invention is to provide a less colored polycarbonate resin, a method of producing the polycarbonate resin, a coating liquid containing the polycarbonate resin, an electrophotographic photoreceptor using the polycarbonate resin, and an electrophotographic device using the polycarbonate resin.

Means for Solving the Problem(s)

According to an aspect of the invention, a polycarbonate resin has a structure represented by a formula (1), in which the polycarbonate resin in a solid form has a yellow index (YI) of 30 or less.

Formula 1

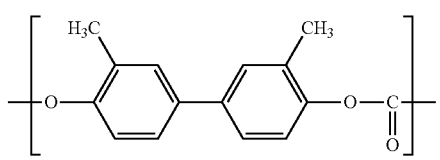

(1)

According to another aspect of the invention, a method of producing the polycarbonate resin according to the above aspect of the invention by an interfacial polycondensation method using an alkaline aqueous solution includes: polymerizing monomers to obtain polymers; and washing the polymers obtained in the polymerizing, in which an oxygen concentration in at least one of a solvent used in the polymerizing or a solvent used in the washing is equal to or less than one-fifth of a saturated dissolved amount of oxygen.

According to still another aspect of the invention, a method of producing the polycarbonate resin according to the above aspect of the invention includes: obtaining a polymer solution comprising polymers and a first solvent; and mixing the polymer solution only with a second solvent different from the first solvent or mixing the polymer solution with a mixture solvent of the second solvent and water to obtain the polycarbonate resin in a solid form, in which methanol is not used as a sole component or a main component of the second solvent.

According to a further aspect of the invention, a method of producing a polycarbonate resin having a structure represented by a formula (1) by an interfacial polycondensation method using an alkaline aqueous solution include: polymerizing monomers to obtain polymers; and washing the polymers obtained in the polymerizing, in which an oxygen concentration in at least one of a solvent used in the polymerizing or a solvent used in the washing is equal to or less than one-fifth of a saturated dissolved amount of oxygen.

Formula 2

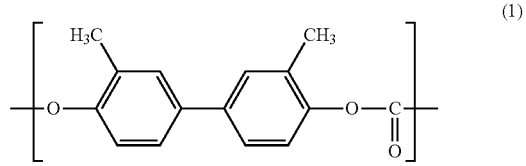

(1)

According to a still further aspect of the invention, a coating liquid contains the polycarbonate resin according to the above aspect of the invention.

According to a still further aspect of the invention, an electrophotographic photoreceptor includes a photosensitive layer containing the polycarbonate resin according to the above aspect of the invention.

According to a still further aspect of the invention, an electrophotographic device includes the electrophotographic photoreceptor according to the above aspect of the invention.

According to the above aspect of the invention, a less colored polycarbonate resin, a method of producing the polycarbonate resin, a coating liquid containing the polycarbonate resin, an electrophotographic photoreceptor using the polycarbonate resin, and an electrophotographic device using the polycarbonate resin are obtainable.

DESCRIPTION OF EMBODIMENT(S)

A polycarbonate resin (hereinafter, also simply referred to as a "PC resin") according to an exemplary embodiment of the invention, a method of producing the polycarbonate resin, a coating liquid containing the PC resin, an electrophotographic photoreceptor using the PC resin, and an electrophotographic device using the PC resin will be described in detail.

PC Resin

The PC resin according to the exemplary embodiment of the invention is represented by a formula (1).

Formula 3

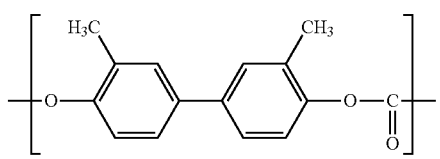

(1)

The PC resin of the exemplary embodiment exhibits a yellow index (YI) of 30 or less in a solid form. With the yellow index (YI) of 30 or less, the PC resin in a solid form is further less colored and favorably applicable to, for instance, an electrophotographic photoreceptor.

Herein, the yellow index (YI) of the PC resin in a solid form is a value measured using a spectrophotometric colorimeter in a reflection mode in accordance with ASTM E-313.

Samples in a solid form of a film, a flake, a pellet and the like are cut or ground at a size of at most 3-mm square and measured. When the PC resin is in a form of a solution, after the solution is dried to remove the solvent, the PC resin can be measured according to the same method as applied to the above samples in a form of a film and the like.

In the exemplary embodiment, the yellow index (YI) of the PC resin in a solid form is preferably 25 or less, more preferably 20 or less. The yellow index (YI) of the PC resin in a solid form is further preferably 15 or less, still further preferably 10 or less, still further preferably 5 or less. The lower limit value is not limited to a particular value.

In the exemplary embodiment, provided that the entire PC resin is defined as 100 mol %, the PC resin is preferably a polycarbonate copolymer (hereinafter, also simply referred to as a "PC copolymer") having a structure represented by the formula (1), the structure accounting for from 25 mol % to 65 mol % and a structure represented by the formula (2), the structure accounting for from 35 mol % to 75 mol %. The PC resin of the exemplary embodiment may be a resin (copolymer) consisting of the structure represented by the formula (1) and the structure represented by the formula (2), or may be a resin (copolymer) including the structure represented by the formula (1), the structure represented by the formula (2), and other structure(s).

Formula 4

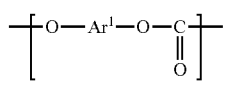

(2)

In the formula (2), $Ar^1$ is a divalent aromatic group. However, $Ar^1$ is not a divalent group derived from 3,3'-dimethyl-4,4'-dihydroxybiphenyl.

When the structure represented by the formula (1) accounts for 25 mol % or more, the PC resin (PC copolymer) exhibits a high hardness and a low gas permeability. When the structure represented by the formula (1) accounts for 65 mol % or less, the PC resin (PC copolymer) exhibits an improved solubility into a solvent, particularly, a non-halogen solvent.

In the PC resin of the exemplary embodiment, provided that the total of the structure represented by the formula (1) and the structure represented by the formula (2) is defined as 100 mol %, it is preferable that the structure represented by the formula (1) accounts for from 25 mol % to 65 mol %, and the structure represented by the formula (2) accounts for from 35 mol % to 75 mol %.

In the formula (2), $Ar^1$ is preferably a divalent group represented by one of formulae (11) to (13).

Formula 5

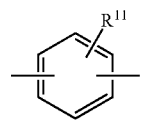

(11)

Formula 6

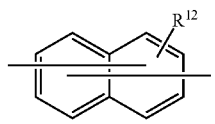

(12)

Formula 7

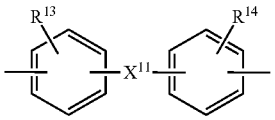

(13)

In the formulae (11) to (13), $R^{11}$ to $R^{14}$ are each independently selected from the group consisting of a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, and a substituted or unsubstituted aryloxy group having 6 to 12 carbon atoms.

A plurality of each of $R^{11}$ to $R^{14}$ may be bonded to a single aromatic ring. In this arrangement, a plurality of $R^{11}$ may be the same group or different groups, a plurality of $R^{12}$ may be the same group or different groups, a plurality of $R^{13}$ may be the same group or different groups, and a plurality of $R^{14}$ may be the same group or different groups.

$X^{11}$ is a single bond or a linking group. When $X^{11}$ is a linking group, the linking group is selected from the group consisting of —O—, —S—, —SO—, —SO$_2$—, —CR$^{15}$R$^{16}$—, a substituted or unsubstituted cycloalkylidene group having 5 to 20 carbon atoms, a substituted or unsubstituted bicyclo-hydrocarbon-diyl group having 5 to 20 carbon atoms, a substituted or unsubstituted tricyclo-hydrocarbon-diyl group having 5 to 20 carbon atoms, a substituted or unsubstituted α,ω-alkylene group having 2 to 12 carbon atoms, a substituted or unsubstituted 9,9-fluorenylidene group, a 1,8-menthanediyl group, a 2,8-menthanediyl group, a substituted or unsubstituted arylene group having 6 to 12 carbon atoms, and α,ω-bis(polyalkylene) dimethylsilyl-polydimethylsiloxy group.

$R^{15}$ and $R^{16}$ are each independently selected from the group consisting of a hydrogen atom, an alkyl group having 1 to 12 carbon atoms, a trifluoromethyl group, and a substituted or unsubstituted aryl group having 6 to 12 carbon atoms.

In the formula (2), $Ar^1$ is preferably a divalent group derived from bisphenols.

Examples of the bisphenols forming $Ar^1$ in the formula (2) include a biphenol compound and a bisphenol compound.

Examples of the biphenol compound include 2,2'-dimethyl-4,4'-dihydroxybiphenyl, 3,3'-diethyl-4,4'-dihydroxybiphenyl, 2,2'-diethyl-4,4'-dihydroxybiphenyl, 3,3'-dipropyl-4,4'-dihydroxybiphenyl, 3,3'-dibutyl-4,4'-dihydroxybiphenyl, 3,3'-bis(trifluoromethyl)-4,4'-dihydroxybiphenyl, 2,2'-bis(trifluoromethyl)-4,4'-dihydroxybiphenyl, and 3,3'-bis(pentafluoroethyl)-4,4'-dihydroxybiphenyl.

Examples of the bisphenol compound include 1,1-bis(3-methyl-4-hydroxyphenyl)methane, 1,1-bis(3-methyl-4-hydroxyphenyl)ethane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, 1,1-bis(4-hydroxyphenyl)-1-phenylpropane, 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 1,1-bis(4-hydroxyphenyl)cyclodecane, 2,2-bis(3-methyl-4-hydroxyphenyl)propane, 1,1-bis(3-methyl-4-hydroxyphenyl)cyclohexane, 1,1-bis(3-ethyl-4-hydroxyphenyl)cyclohexane, 1,1-bis(3-trifluoromethyl-4-hydroxyphenyl)methane, 2,2-bis(3-trifluoromethyl-4-hydroxyphenyl)ethane, 2,2-bis(2-methyl-4-hydroxyphenyl)propane, 2,2-bis(3-trifluoromethyl-4-hydroxyphenyl)propane, 2,2-bis(3-trifluoromethyl-4-hydroxyphenyl)butane, 1,1-bis(3-trifluoromethyl-4-hydroxyphenyl)cyclohexane, 9,9-bis(4-hydroxyphenyl)fluorene, and 9,9-bis(3-methyl-4-hydroxyphenyl)fluorene.

In view of solubility and wear resistance, a preferable one among the bisphenols is a bisphenol in which $X^{11}$ in the formula (13) is a cycloalkylidene group and an aromatic ring bonded with a hydroxyl group includes a hydrocarbon group having at most six carbon atoms. Among the bisphenols, 1,1-bis(3-methyl-4-hydroxyphenyl)cyclohexane is more preferable.

In the exemplary embodiment, a haze value of a solution in which the PC resin is dissolved at a concentration of 10 mass % in tetrahydrofuran (hereinafter, occasionally abbreviated as THF) is preferably 5% or less. At 5% or less of the haze value of the solution in which the PC resin is dissolved at a concentration of 10 mass % in tetrahydrofuran, the PC resin is favorably usable for purposes requiring transparency. In addition, when the PC resin is used as a binder resin for an electrophotographic photoreceptor, a favorable image is obtainable.

The haze value can be measured in accordance with JIS K7105 using a fully automatic haze computer (HGM-2D) manufactured by Suga Test Instruments Co., Ltd.

In the PC resin (PC copolymer) in the exemplary embodiment, provided that abundance of a compound represented by a formula (3-1) relative to the PC resin (PC copolymer) is defined as X (μg/g) and abundance of a compound represented by a formula (3-2) relative to the PC resin (PC copolymer) is defined as Y (μg/g), a value of X+20×Y is preferably 400 or less. A content of the compound represented by the formula (3-1) and a content of the compound represented by the formula (3-2) in the PC resin (PC copolymer) can be measured according to LC (Liquid Chromatography).

Formula 8

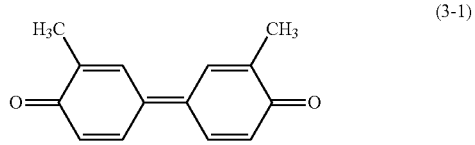

(3-1)

Formula 9

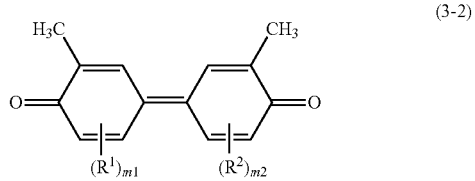

(3-2)

Each of the compounds represented by the formulae (3-1) and (3-2) includes a cis-compound and a trans-compound in terms of a positional relationship of a methyl group.

In the formula (3-2), $R^1$ and $R^2$ are each independently a methyl group or a hydroxyl group, m1 is 0 or 1, m2 is 0 or 1, and m1+m2 is 1 or 2.

When the value of X+20×Y is 400 or less, the yellow index (YI) of the PC resin in a solid form can be 30 or less.

In order to reduce the coloring of the PC resin (PC copolymer), the value of X+20×Y is more preferably 300 or less, further preferably 100 or less.

Moreover, Y is preferably 10 or less and X is preferably 100 or less.

Production Method of PC Resin

A method of producing the PC resin according to the exemplary embodiment will be exemplarily described with reference to a first production method and a second production method.

First Production Method

The first production method is a method of producing a polycarbonate resin having the structure represented by the formula (1) according to an interfacial polycondensation method using an alkaline aqueous solution.

The first production method includes: polymerizing monomers to obtain polymers; and washing the polymers obtained in the above polymerizing.

An oxygen concentration in at least one of a solvent used in the polymerizing or a solvent used in the washing is equal to or less than one-fifth of a saturated dissolved amount of oxygen.

According to the first production method, a less colored PC resin (e.g., the PC resin according to the exemplary embodiment having the yellow index (YI) 30 or less in a solid form) can be easily obtained.

Polymerizing

In the polymerizing, monomers (raw material) are polymerized according to the interfacial polycondensation method polymer, so that polymers are obtained.

In the exemplary embodiment, 3,3'-dimethyl-4,4'-dihydroxybiphenyl is at least used as the raw material. In addition, 1,1-bis(3-methyl-4-hydroxyphenyl)cyclohexane is preferably usable as the monomers.

In the first production method, the monomers can be polymerized according to any known interfacial polycondensation method, provided that the oxygen concentration in the solvent used in at least one of the polymerizing or the later-described washing is equal to or less than one-fifth of the saturated dissolved amount of oxygen. A use of an antioxidant in the polymerizing is preferable since the use of the antioxidant can more effectively prevent the PC resin from being colored. Although any known antioxidants are usable as the antioxidant, hydrosulfite is more preferable as the antioxidant.

Moreover, the monomers are preferably polymerized according to an interfacial polycondensation method using an alkaline aqueous solution and a solvent capable of dissolving the obtained PC resin and substantially evenly unmixable with the alkaline aqueous solution.

In the first production method, as described in Preparation Example 1 below, the polymerizing may be conducted in two stages of: polymerizing the monomers to prepare oligomers (i.e., oligomer preparation); and polymerizing the prepared oligomers and monomers to prepare the polymers (i.e., polymer preparation).

The dissolved oxygen can be measured using a dissolved oxygen meter (i.e., DO meter B-506 manufactured by Iijima Electronics Corporation).

Examples of a usable method of reducing the oxygen concentration in the solvent, which is to be used in the polymerizing, to be equal to or less than one-fifth of the saturated dissolved amount of oxygen includes: a method of injecting an inert gas for avoiding an oxidation reaction into a solvent, a method of flowing the inert gas for avoiding the oxidation reaction into a gas layer of a reactor, a method of reducing a pressure of a reaction solvent to remove dissolved oxygen, and a method of absorbing (adsorbing) oxygen physically and/or chemically. Examples of the inert gas for avoiding the oxidation reaction may include nitrogen and noble gas (e.g., argon).

One of the methods may be conducted alone. Alternatively, a plurality of ones of the methods may be combined and conducted at the same time or in stages.

The reduction in a dissolved oxygen amount (the oxygen concentration) in the solvent used in the polymerizing to be equal to or less than one-fifth of a saturated oxygen amount (the saturated dissolved amount of oxygen) of the solvent can inhibit OCBP from being oxidized to generate a colored substance (e.g., dimethyldiphenoquinone) during polymerization. Though a saturated oxygen concentration of water used for the polymerization is affected by, for instance, a coexisting substance to fluctuate, a reduction rate of an oxygen concentration is calculated based on a saturated oxygen concentration of pure water in the exemplary embodiment. A value of a saturated concentration of pure water described in known documents is usable as the saturated concentration of pure water in the exemplary embodiment. Though the saturated dissolved oxygen amount is usually decreased when a temperature increases, since a speed of the oxidation reaction is increased when the temperature increases, coloring is effectively prevented by more reducing the oxygen concentration as the temperature becomes higher. For this reason, it is preferable to set the dissolved oxygen amount to be equal to or less than one-fifth of the saturated dissolved oxygen amount at the maximum temperature based on the saturated dissolved oxygen amount at the maximum temperature during the polymerization.

When the polymerizing is conducted in the two stages of the oligomer preparation and the polymer preparation, it is only necessary that the oxygen concentration in the solvent(s) used in at least one of the oligomer preparation or the polymer preparation is equal to or less than one-fifth of the saturated dissolved amount.

When the solvent(s) having an oxygen concentration equal to or less than one-fifth of the saturated dissolved amount therein is used in the polymerizing, it is only necessary to reach this saturated dissolved amount at or before a start of the polymerization reaction. The solvents may be used after oxygen dissolved in each solvent is reduced. Alternatively, after the solvents are mixed in a reactor, dissolved oxygen may be reduced. In order to more effectively inhibit the generation of the colored substance (e.g., dimethyldiphenoquinone), it is preferable to reduce the oxygen concentration in the solvent to be equal to or less than one-fifth of the saturated dissolved amount before OCBP monomers are brought into contact with a solvent used in the polymerizing (i.e., before the start of the polymerization).

Washing

In the washing, an organic solvent solution of the polymers obtained in the polymerizing is washed with a liquid.

Examples of the liquid used in the washing include an alkaline aqueous solution such as sodium hydroxide, an acidic aqueous solution such as hydrochloric acid, and pure water such as ion-exchange water. Unreacted OCBP that has not been used in the polymerizing can be removed by repeating washing the organic solvent solution with the alkaline aqueous solution such as sodium hydroxide. Moreover, by washing the organic solvent solution with the acidic aqueous solution, an amine compound used as a catalyst and an alkaline substance (e.g., sodium hydroxide) used in the polymerizing and the washing can be removed. Furthermore, by washing the organic solvent solution with pure water, a salt generated in a neutralization reaction described above in the washing can be removed.

In the first production method, the polymers can be washed according to any known washing method, provided that the oxygen concentration in the solvent used in at least one of the polymerizing or the washing described above is equal to or less than one-fifth of the saturated dissolved amount of oxygen.

Coloring is highly preventable particularly when the dissolved oxygen is reduced at a stage where a lot of residual monomers are present in an organic solvent layer and the alkaline aqueous solution, in other words, at a stage where the washing with the alkaline aqueous solution is conducted at a small number of times. In the method according to the exemplary embodiment, after the polymerization, an organic layer is separated from an aqueous layer and the organic layer is washed with the alkaline aqueous solution, thereby removing redundant OCBP that has not contributed to the polymerization reaction. A residual amount of OCBP in the aqueous layer is relatively large at an initial stage for separating the liquid, but, as the washing with the alkaline aqueous solution proceeds, the residual amount of OCBP in the aqueous layer becomes relatively small. At the initial stage for separating the liquid, an organic solvent for dilution and, if necessary, water are typically added to the polymer solution obtained in the polymerizing. When dissolved oxygen is contained in the solvent, a possibility that OCBP can change to a colored substance is adversely increased. Although the coloring can also be sufficiently prevented by reducing the dissolved oxygen according to the same method as the above method described in the polymerizing after the dilution solvent is introduced to the reactor, it is more preferable to reduce in advance the dissolved oxygen in the organic solvent to be added at the initial stage for separating the liquid and the dissolved oxygen in water, after the polymerization.

The reduction in the dissolved oxygen amount (the oxygen concentration) in the solvent used in the washing to be equal to or less than one-fifth of the saturated oxygen amount (the saturated dissolved amount of oxygen) in the solvent can inhibit OCBP from being oxidized to generate a colored substance (e.g., dimethyldiphenoquinone).

In the exemplary embodiment, an oxygen concentration in at least one of the solvent used in the polymerizing or the solvent used in the washing is preferably 2 mg/L or less. At 2 mg/L or less of the dissolved oxygen amount (the oxygen concentration) of the solvent used in a period from the polymerizing to the washing, a yellow index (YI) of the obtained PC resin can be reduced to 30 or less irrespective of an after treatment method.

When water is used in at least one of the polymerizing or the washing, the dissolved oxygen concentration in water used in the polymerizing and the washing is preferably 2 mg/L or less, more preferably 1 mg/L or less, further preferably 0.5 mg/L or less.

Second Production Method

A second production method includes: obtaining a polymer solution containing polymers and a first solvent; and mixing the polymer solution only with a second solvent different from the first solvent or mixing the polymer solution with a mixture solvent of the second solvent and water to obtain a polycarbonate resin in a solid form. It should be noted that methanol is not used as a sole component or a main component of the second solvent.

Use of methanol as the sole component or the main component of the second solvent is not preferable since methanol cause polymer decomposition. The solvent containing methanol as the "main component" refers to a mixture solvent in which methanol and other solvent(s) are mixed and a mixture ratio of the methanol is 50 mass % or more of the mixture solvent.©

Methanol is usable in a mixture in which other liquid(s) is mixed for avoiding polymer decomposition.

For use of methanol, a mixture ratio of the methanol to other liquid(s) is preferably less than 50 mass %, more preferably 30 mass % or less.

When obtaining the polycarbonate resin in a solid form, a poor solvent against the polymers is preferably used as the second solvent.

Herein, the "poor solvent" refers to a solvent in which a solubility at a temperature of 25 degrees C. of a PC resin is 1 mass % or less, preferably 0.1 mass % or less, the solvent being less likely to swell the polymers.

A ratio between the polymer solution and the poor solvent depends on kinds of the solvent of the polymer solution, kinds of the poor solvent, temperatures and the like. The ratio between the polymer solution and the poor solvent at the finish time of the mixing (e.g., dropping) only needs to be set at a ratio at which the obtained PC resin does not re-aggregate. For instance, when a methylene chloride solution of the polymers is dropped into isopropanol, a volume of the isopropanol is preferably in a range from 1.5 times to 10 times as much as a volume of the polymer solution defined as 1. When the volume of the isopropanol is 1.5 times or more, the obtained resin is less likely to re-aggregate. When the volume of the isopropanol is 10 times or less, a favorable volumetric efficiency in the production is obtainable and a bulk density of the obtained resin is kept from becoming extremely low. The ratio between the poor solvent and the polymer solution may be kept constant from the mixing start to the mixing finish, or may be fluctuated.

In the method according to the above aspect of the invention, it is preferable that the second solvent used in obtaining the polycarbonate resin in a solid form is a poor solvent against the polymers, and the polycarbonate resin in a solid form is obtained with use of a difference in solubility of the polymers by heating a mixture solution of the polymer solution only with the second solvent or a mixture solution of the polymer solution with the mixture solvent of the second solvent and water to reach at least a boiling point of the first solvent to distill the first solvent from the mixture solution.

In order to heat the mixture solution of the polymer solution only with the second solvent or mixing the polymer solution with the mixture solvent of the second solvent and water to reach at least a boiling point of the first solvent, a boiling point of the second solvent is preferably a temperature higher by at least 10 degrees C. than the boiling point of the first solvent. The boiling point of the second solvent is more preferably a temperature higher by at least 20 degrees C. than the boiling point of the first solvent, further preferably a temperature higher by at least 30 degrees C. than the boiling point of the first solvent. It is also preferable that the boiling point of the second solvent is not excessively high in order to dry the obtained PC resin. The boiling point of the second solvent is, at the ambient pressure, preferably at most 120 degrees C., more preferably at most 100 degrees C., further preferably at most 90 degrees C., still further preferably at most 80 degrees C.

In the second production method, the second solvent is preferably a poor solvent against the polymers.

In addition, the second solvent is preferably a solvent in which a solubility of the polymers is low and a boiling point falls within an appropriate range. Examples of the solvent satisfying these conditions include ethanol, 1-propanol, 2-propanol, 1-butanol, 2-butanol, isobutanol, t-butanol, acetone, methyl ethyl ketone (MEK), a solvent containing hydrocarbon having 5 to 8 carbon atoms as a main component, heptane and toluene.

The second solvent preferably contains at least one of the above examples of the solvent.

The solvent containing hydrocarbon having 5 to 8 carbon atoms as the "main component" refers to a solvent containing at least 50 mass % of hydrocarbon having 5 to 8 carbon atoms based on the total mass of the solvent.

In order to prepare from OCBP a resin having a high viscosity average molecular weight, for instance, a high viscosity average molecular weight exceeding 30000 suitably used for an electrophotographic photoreceptor, it is preferable to use a so-called "interfacial polycondensation method." However, it has been known that the PC resin prepared from OCBP according to the interfacial polycondensation method is adversely colored in yellow to brown. It has not yet been revealed why such an outstanding coloring is caused as compared with a polycarbonate resin prepared from other materials (e.g., bisphenol A).

The inventors have revealed a coloring mechanism by specifying a color-causing substance, and devised a means for preventing coloring based on the coloring mechanism, and established a method of obtaining a less colored resin (particularly, a resin having a yellow index (YI) of 30 or less).

Examples of a specific method of decreasing a coloring degree are as follows:

(1) decreasing contact of OCBP with oxygen in a period from the resin synthesis (the polymerizing) to the washing where OCBP and an alkaline aqueous solution are brought into contact with each other at a high concentration, particularly, in the washing where the residual amount of OCBP is large and an alkaline aqueous solution is used (i.e., the above-described first production method); and (2) transferring the colored substance existing in a resin solution or a solid resin to an organic solvent to reduce a coloring component (i.e., the above-described second production method).

Coating Liquid

A coating liquid according to an exemplary embodiment of the invention contains the PC resin of the above exemplary embodiment.

The coating liquid according to the exemplary embodiment preferably contains a solvent capable of dissolving or dispersing the PC resin according to the above exemplary embodiment.

As the solvent usable in the exemplary embodiment, a single solvent may be used alone or a plurality of solvents may be mixed for use, considering solubility, dispersibility, viscosity, evaporation speed, chemical stability and stability against physical changes, and the like of the PC resin according to the exemplary embodiment and other material.

In the exemplary embodiment, the solvent preferably includes the organic solvent in terms of easy handling. Specific examples of the organic solvent include:

an aromatic hydrocarbon solvent (e.g., benzene, toluene, xylene, and chlorobenzene); a ketone solvent (e.g., acetone, methyl ethyl ketone, cyclohexanone, cyclopentanone, and methyl isobutyl ketone); an ester solvent (e.g., acetic ether, ethyl cellosolve, and ε-caprolactam); a halogenated hydrocarbon solvent (e.g., carbon tetrachloride, carbon tetrabromide, chloroform, dichloromethane, and tetrachloroethane); an ether solvent (e.g., tetrahydrofuran, dioxolane, and dioxane); an amide solvent (e.g., dimethylformamide, and diethyl formamide); and a sulfoxide solvent (e.g., dimethyl sulfoxide). The organic solvent preferably has the boiling point of 160 degrees C. or less in terms of applicability of the organic solvent to a process. One of the above solvents may be used alone, or two or more of the solvents may be used together as a mixture solvent.

In the exemplary embodiment, the organic solvent preferably includes no amide organic solvent and no halogen organic solvent in terms of environmental health, vaporizability, solubility, handleability and economic performance. Moreover, in the exemplary embodiment, the organic solvent preferably includes a non-halogen organic solvent in terms of safety.

Examples of the non-halogen organic solvent include: an ether solvent (e.g., tetrahydrofuran, dioxane, and dioxolane); an aromatic hydrocarbon solvent (e.g., paraxylene, and toluene); and a ketone solvent (e.g., methyl ethyl ketone, cyclohexanone, and cyclopentanone). Among the examples, the organic solvent preferably contains at least one of tetrahydrofuran, dioxolane, toluene, cyclohexanone, or cyclopentanone, more preferably contains tetrahydrofuran since the PC resin in the exemplary embodiment is highly soluble in the exemplified solvents.

The concentration of the PC resin component in the coating liquid according to the exemplary embodiment only needs to be a concentration at which the coating liquid exhibits a suitable viscosity for applications. The concentration of the PC resin component is preferably in a range from 0.1 mass % to 40 mass %, more preferably in a range from 1 mass % to 35 mass %, most preferably in a range from 5 mass % to 30 mass %. At 40 mass % or less of the concentration, the viscosity is not excessively high and a coating performance is favorable. At 0.1 mass % or more of the concentration, the viscosity can be kept suitable, so that a uniform film is obtainable. Moreover, the concentration in the above range is suitable for shortening a drying time after the coating liquid is applied and for easily providing a target film thickness.

Since the PC resin of the exemplary embodiment is far less colored PC resin having the yellow index (YI) of 30 or less, when the PC resin is dissolved in the above solvent, particularly, the non-halogen organic solvent, a less colored solution is obtainable. Accordingly, use of the coating liquid of the exemplary embodiment containing the above PC resin can produce a less colored product. Moreover, less coloring of the solution means that a quinone compound (i.e., a color-causing substance) is contained at a small amount in the solution. Accordingly, such a possibility is reduced that quinone in the coating liquid is affected by a chemical action and a physical action to be changed in properties to change properties of the coating liquid. Consequently, the physical and chemical stability of the coating liquid is improved.

The coating liquid may contain an additive in addition to the PC resin and the solvent of the exemplary embodiment. Examples of the additive include a low molecular compound, a colorant (e.g., a dye and a pigment), a functional compound (e.g., a charge transporting material, an electron transporting material, a hole transporting material and a charge generating material), a filler (e.g., an inorganic or organic filler, fiber and particles), an antioxidant, a UV absorbent and an acid scavenger. The coating liquid may contain a resin other than the resin of the exemplary embodiment.

Substances known as resins containable in the PC resin are usable as the additive and other resins.

When the coating liquid of the exemplary embodiment contains a charge transporting material, a ratio by mass between the PC resin and the charge transporting material in the coating liquid is preferably in a range from 20:80 to 80:20 in terms of a product performance, more preferably in a range from 30:70 to 70:30.

In the coating liquid of the exemplary embodiment, one of the PC resin of the exemplary embodiment may be used alone, or two or more thereof may be used together.

The coating liquid according to the exemplary embodiment is typically preferably used for forming the charge transporting layer of a laminated electrophotographic photoreceptor in which a photosensitive layer at least includes the charge generating layer and the charge transporting layer. When the coating liquid further contains the charge generating material, the coating liquid is also usable for forming a photosensitive layer of a single-layer electrophotographic photoreceptor.

Electrophotographic Photoreceptor

An electrophotographic photoreceptor according to an exemplary embodiment of the invention contains the PC resin of the above exemplary embodiment in a photosensitive layer.

Since the PC resin of the exemplary embodiment is less colored, the electrophotographic photoreceptor of the exemplary embodiment can provide an electrophotographic photoreceptor having a less colored photosensitive layer.

Moreover, a small coloring degree means a small amount of the color-causing substance. Accordingly, it is preferable to use the PC resin of the exemplary embodiment as a binder resin for the electrophotographic photoreceptor, since an increase in the residual potential is avoidable.

For instance, the electrophotographic photoreceptor of the exemplary embodiment may include a conductive substrate and a photosensitive layer on the conductive substrate.

The electrophotographic photoreceptor in the exemplary embodiment may be structured in any manner including the structures of known various types of electrophotographic photoreceptors as long as the PC resin of the exemplary embodiment is contained in the photosensitive layer.

In terms of the production cost, the electrophotographic photoreceptor is preferably a multi-layered electrophotographic photoreceptor in which the photosensitive layer includes at least one charge generating layer and at least one charge transporting layer, or a single-layer electrophotographic photoreceptor in which single photosensitive layer includes both a charge generating material and a charge transporting material.

While the PC resin of the exemplary embodiment may be used in any portion of the photosensitive layer, in order for the invention to sufficiently provide an advantage, the PC resin is preferably used as the binder resin of the charge transporting material in the charge transporting layer, or as the binder resin for the single photosensitive layer. Moreover, the PC resin of the exemplary embodiment is preferably used as a surface protection layer in addition to the photosensitive layer. When the electrophotographic photoreceptor has two charge transporting layers (i.e., multilayer electrophotographic photoreceptor), the PC resin of the exemplary embodiment is preferably contained in one or both of the two charge transporting layers.

In the electrophotographic photoreceptor according to the exemplary embodiment, one type of the PC resin according to the exemplary embodiment may be used alone, or two or more types thereof may be combined for use. Further, as long as an object of the invention is not hampered, a binder-resin component such as another polycarbonate may be contained as desired. In addition, an additive such as an antioxidant may be contained.

The electrophotographic photoreceptor according to the exemplary embodiment includes a conductive substrate and a photosensitive layer on the conductive substrate. When the photosensitive layer has the charge generating layer and the charge transporting layer, the charge transporting layer may be laminated on an upper side of the charge generating layer, or alternatively, the charge generating layer may be laminated on an upper side of the charge transporting layer. Further alternatively, the electrophotographic photoreceptor may include a single photosensitive layer simultaneously containing both the charge generating material and the charge transporting material. Furthermore, a conductive or insulating protective film may be formed as needed on a surface layer of the electrophotographic photoreceptor. Use of the PC resin of the exemplary embodiment in any one of the layers of the photoreceptor can provide the electrophotographic photoreceptor having practically sufficient sensitivity and electrical characteristics in an electrophotographic process.

The electrophotographic photoreceptor may be further provided with an intermediate layer(s) such as an adhesive layer for enhancing adhesion between layers and a blocking layer for blocking charges.

Various materials (e.g., known materials) are usable as a material for the conductive substrate used in the electrophotographic photoreceptor of the exemplary embodiment. Examples of the material for the conductive substrate include: a plate, a drum and a sheet made of material such as aluminum, nickel, chrome, palladium, titanium, molybdenum, indium, gold, platinum, silver, copper, zinc, brass, stainless steel, lead oxide, tin oxide, indium oxide, ITO (indium tin oxide; tin-doped indium oxide) and graphite; glass, cloth, paper, plastic film, plastic sheet and seamless belt having been treated with conductive treatment through coating by vapor deposition, sputtering or application; and a metal drum having been treated with metal oxidation treatment by electrode oxidation and the like.

The charge generating layer at least contains a charge generating material. The charge generating layer can be obtained by forming a layer of the charge generating material on the underlying conductive substrate by vacuum deposition, sputtering or the like, or by forming a layer in which the charge generating material is bound onto the underlying substrate using a binder resin. Various methods (e.g., known methods) are applicable to a method of forming the charge generating layer using a binder resin. In terms of the production cost, the charge generating layer is preferably obtained as a wet molding typically formed by, for instance, applying a coating liquid, in which both the charge generating material and the binder resin are dispersed or dissolved in a suitable solvent, onto a predetermined underlying substrate and drying the applied coating liquid.

Various known materials are usable as the charge generating material in the charge generating layer. Examples of specific compounds of such materials are: elementary selenium (e.g., amorphous selenium and trigonal selenium); selenium alloy (e.g., selenium-tellurium); selenium compound or selenium-containing composition (e.g., $As_2Se_3$); zinc oxide; inorganic material formed of elements of Group 12 and Group 16 in the periodic table (e.g., CdS-Se); oxide semiconductor (e.g., titanium oxide); silicon material (e.g., amorphous silicon); metal-free phthalocyanine pigment (e.g., τ-type metal-free phthalocyanine and X-type metal-free phthalocyanine); metal phthalocyanine pigment (e.g., α-type copper phthalocyanine, β-type copper phthalocyanine, γ-type copper phthalocyanine, ε-type copper phthalocyanine, X-type copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine whose black angle 2θ has its strong diffraction peak at 27.3±0.2 degrees in a X-ray diffraction diagram, and gallium phthalocyanine); cyanine dye; anthracene pigment; bisazo pigment; pyrene pigment; polycyclic quinone pigment; quinacridone pigment; indigo pigment; perylene pigment; pyrylium dye; squarium pigment; anthoanthrone pigment; benzimidazole pigment; azo pigment; thioindigo pigment; quinoline pigment; lake pigment; oxazine pigment; dioxazine pigment; triphenylmethane pigment; azulenium dye; triarylmethane dye; xanthine dye; thiazine dye; thiapyrylium dye; polyvinyl carbazole; and bisbenzimidazole pigment. One of the above compounds may be used alone, or two or more thereof may be mixed for use as the charge generating material. Among the above charge generating materials, a charge generating material specifically disclosed in JP 11-172003 A is preferable in terms of the performance and safety.

The charge transporting layer can be obtained as a wet molding by forming a layer in which the charge transporting material is bound onto the underlying conductive substrate by a binder resin.

Various known resins are usable as the binder resin for the charge generating layer and the charge transporting layer. Examples of such resins are polystyrene, polyvinyl chloride, polyvinyl acetate, vinyl chloride-vinyl acetate copolymer, polyvinyl acetal, alkyd resin, acrylic resin, polyacrylonitrile, polycarbonate, polyurethane, epoxy resin, phenol resin, polyamide, polyketone, polyacrylamide, butyral resin, polyester, vinylidene chloride-vinyl chloride copolymer, methacrylic resin, styrene-butadiene copolymer, vinylidene chloride-acrylonitrile copolymer, vinyl chloride-vinyl acetate-maleic anhydride copolymer, silicone resin, silicone-alkyd resin, phenol-formaldehyde resin, styrene-alkyd resin, melamine resin, polyether resin, benzoguanamine resin, epoxy-acrylate resin, urethane acrylate resin, poly-N-vinylcarbazole, polyvinyl butyral, polyvinyl formal, polysulphone, casein, gelatine, polyvinyl alcohol, ethyl cellulose, cellulose nitrate, carboxymethyl cellulose, vinylidene chloride polymer latex, acrylonitrile-butadiene copolymer, vinyl toluene-styrene copolymer, soybean oil-modified alkyd resin, nitrated polystyrene, polymethylstyrene, polyisoprene, polythiocarbonate, polyarylate, polyhaloarylate, polyallyl ether, polyvinyl acrylate and polyester acrylate.

One of the above resins may be used alone, or two or more thereof may be mixed for use. For the above reason, the PC copolymer according to the exemplary embodiment is preferably used as the binder resin used for the charge generating layer and the charge transporting layer.

While various known methods are usable for forming the charge transporting layer, the charge transporting layer is preferably obtained, in terms of the production cost, as a wet molding formed by applying a coating liquid, in which both the charge transporting material and the PC resin of the exemplary embodiment are dispersed or dissolved in a suitable solvent, onto a predetermined underlying substrate and drying the applied coating liquid. A blending ratio by mass between the charge transporting material and the PC resin that are used for forming the charge transporting layer is preferably in a range from 20:80 to 80:20, more preferably from 30:70 to 70:30 in terms of the product performance.

In the charge transporting layer, one type of the PC resin of the exemplary embodiment may be used alone, or two or more types thereof may be mixed for use. As long as an object of the invention is not hampered, another binder resin in addition to the PC resin of the exemplary embodiment may be used.

A thickness of the thus formed charge transporting layer is preferably in a range from 5 μm to 100 μm, more preferably in a range from 10 μm to 30 μm. The reduction in the initial potential is avoidable at the thickness of 5 μm or more, while the deterioration in the electrophotographic performance is avoidable at the thickness of 100 μm or less.

Various known compounds are usable as the charge transporting material that is usable together with the PC resin of the exemplary embodiment. Preferable examples of such compounds are carbazole compound, indole compound, imidazole compound, oxazole compound, pyrazole compound, oxadiazole compound, pyrazoline compound, thiadiazole compound, aniline compound, hydrazone compound, aromatic amine compound, aliphatic amine compound, stilbene compound, fluorenone compound, butadiene compound, quinone compound, quinodimethane compound, thiazole compound, triazole compound, imidazolone compound, imidazolidine compound, bisimidazolidine compound, oxazolone compound, benzothiazole compound, benzimidazole compound, quinazoline compound, benzofuran compound, acridine compound, phenazine compound, poly-N-vinylcarbazole, polyvinyl pyrene, polyvinyl anthracene, polyvinyl acridine, poly-9-vinyl phenyl anthracene, pyrene-formaldehyde resin, ethylcarbazole resin, and a polymer having the above structure in the main chain or side chain. One of the above compounds may be used alone, or two or more thereof may be combined for use.

Among the above charge transporting materials, a compound specifically disclosed in JP11-172003A and the charge transporting materials structured as follows are preferably used in terms of the performance and safety.

Formula 10

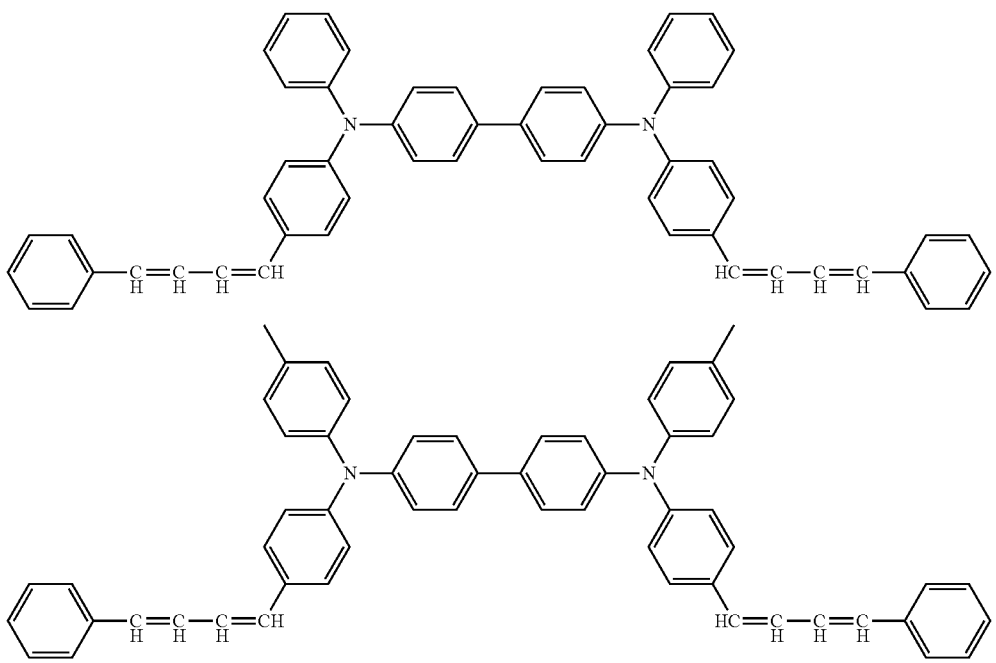

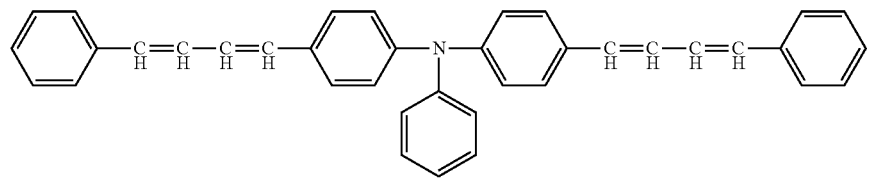
Formula 11
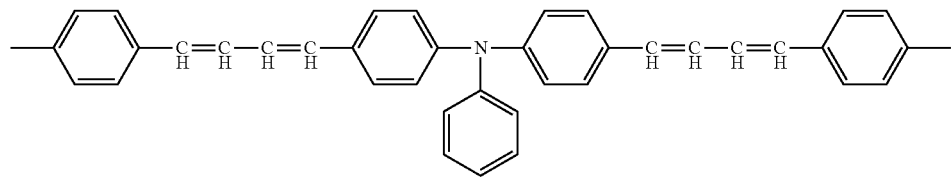
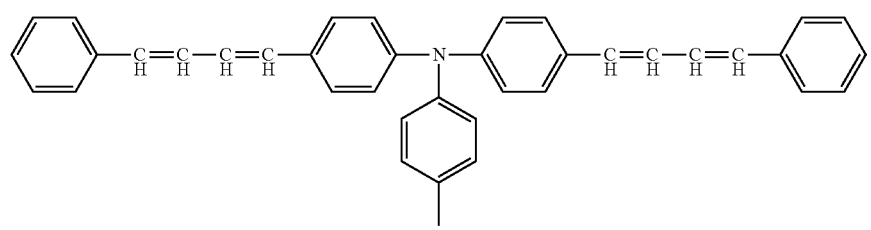
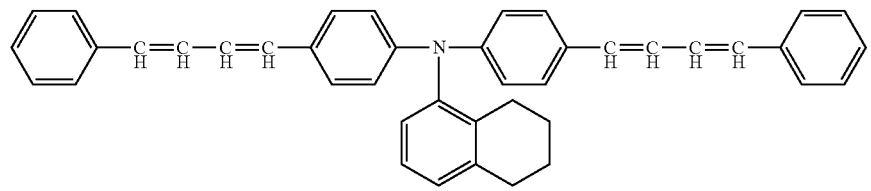
Formula 12
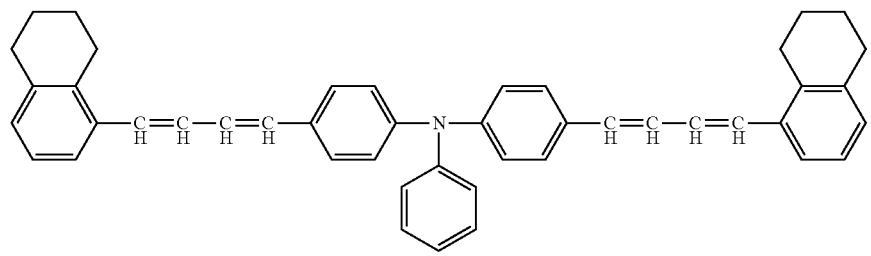
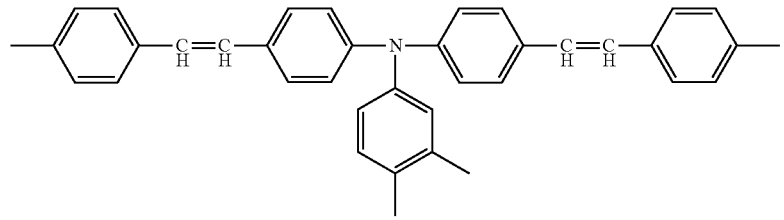
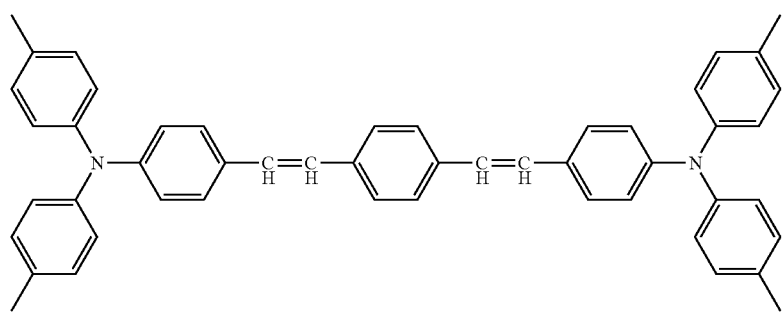

Formula 13
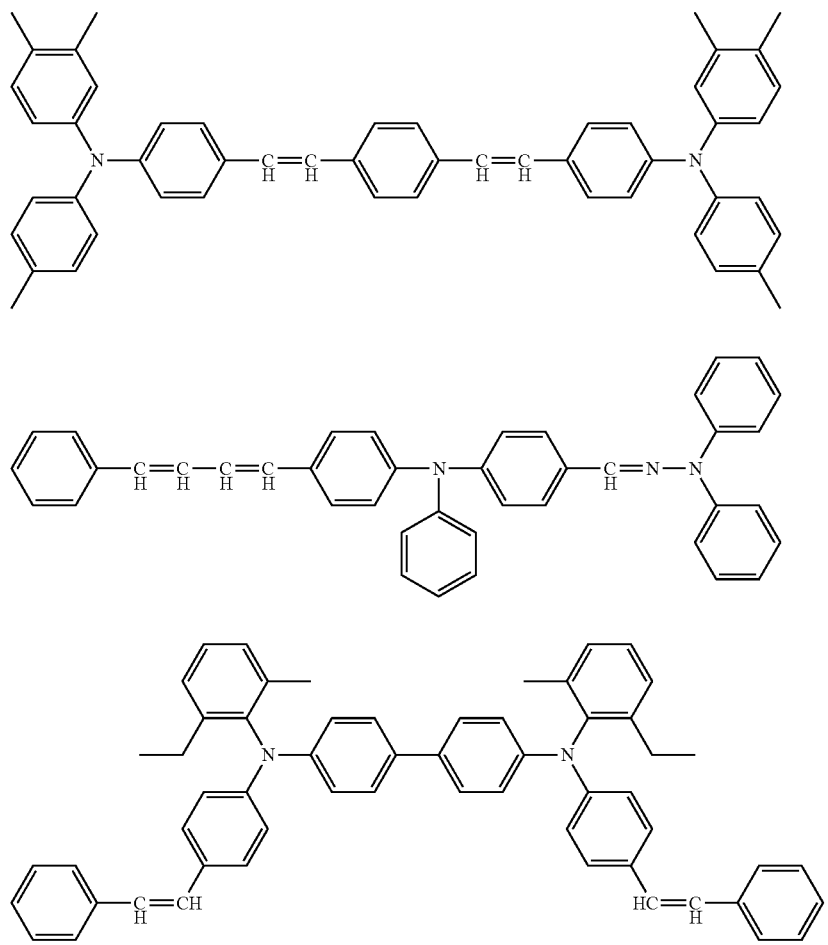
Formula 14
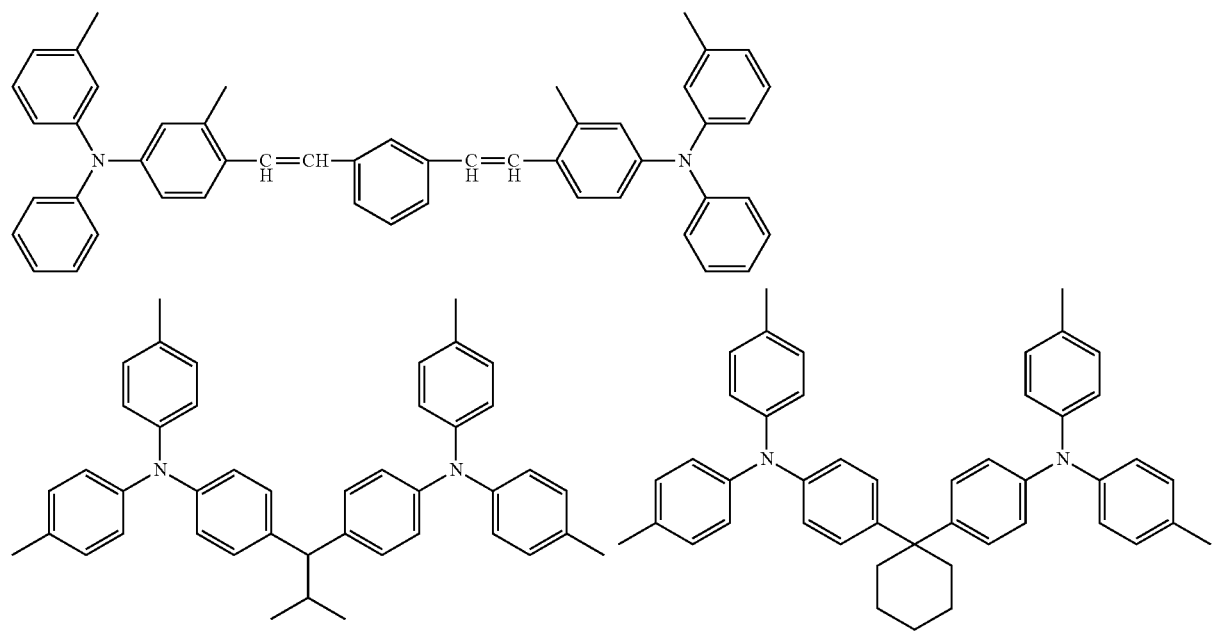

Formula 15
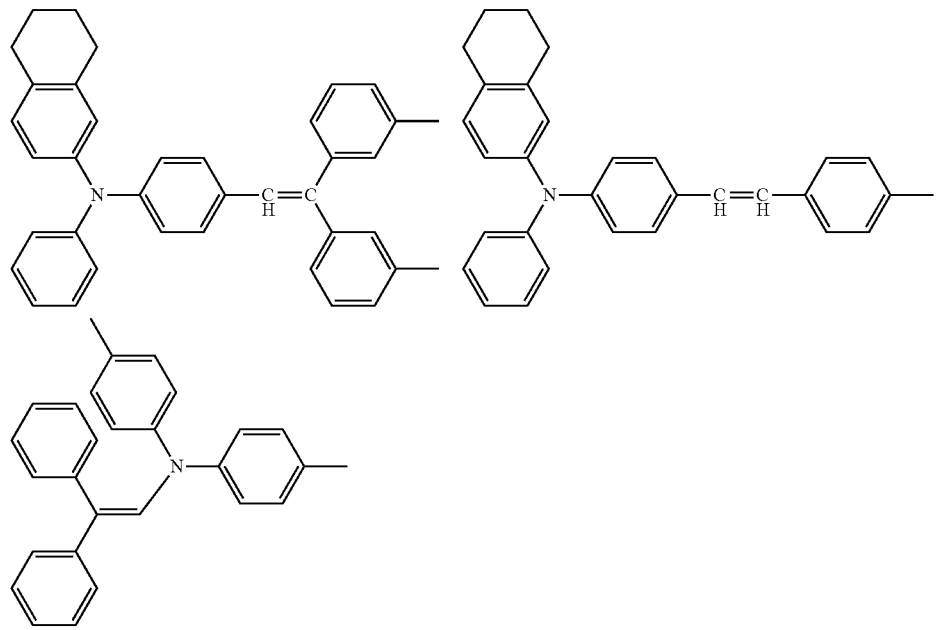
Formula 16
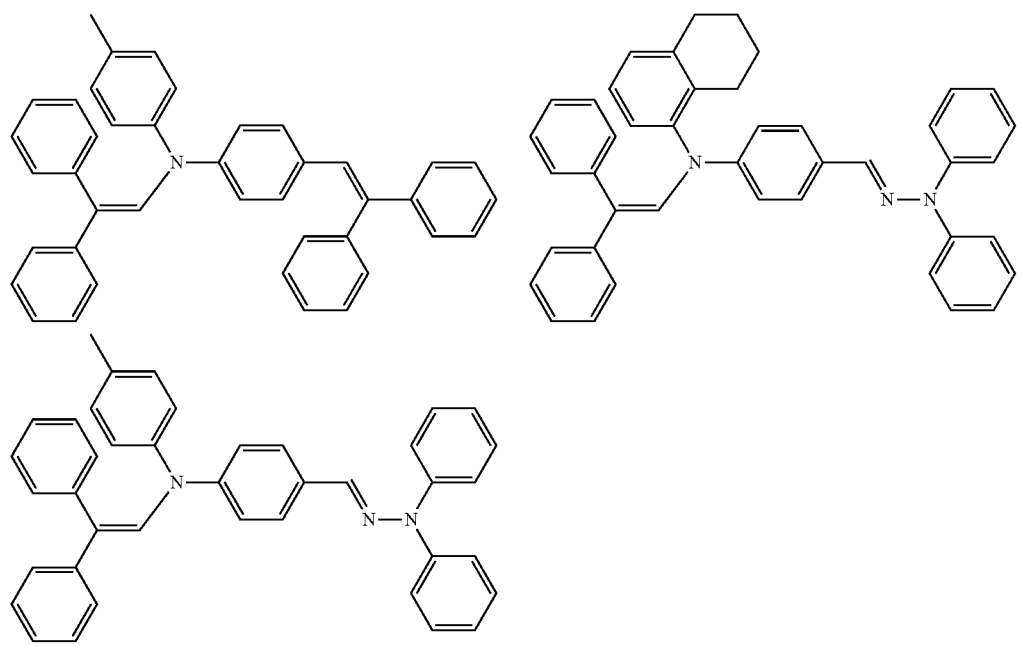
Formula 17
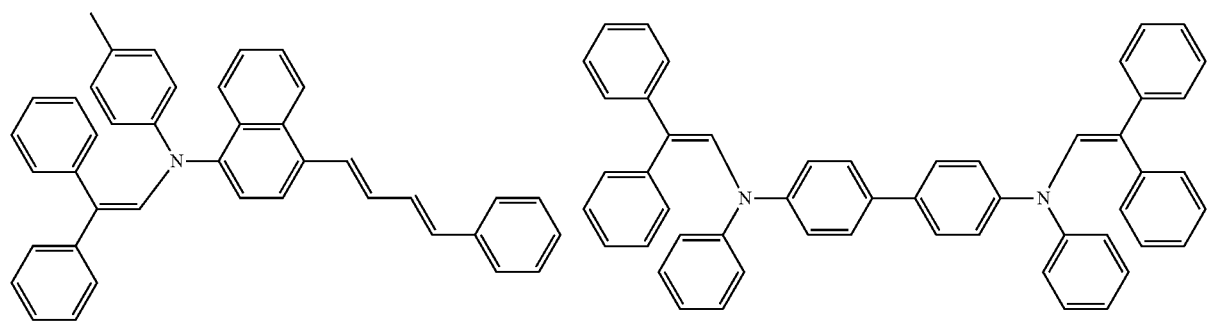

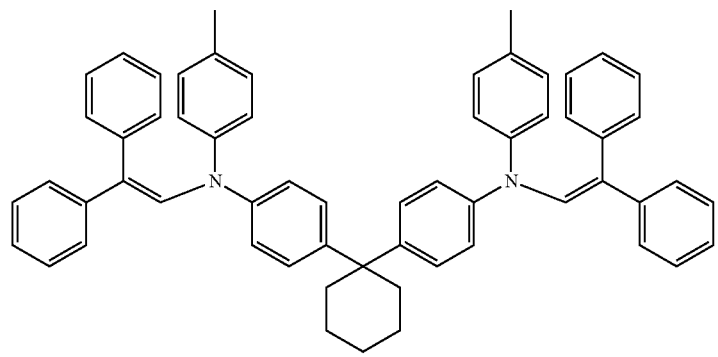
Formula 18
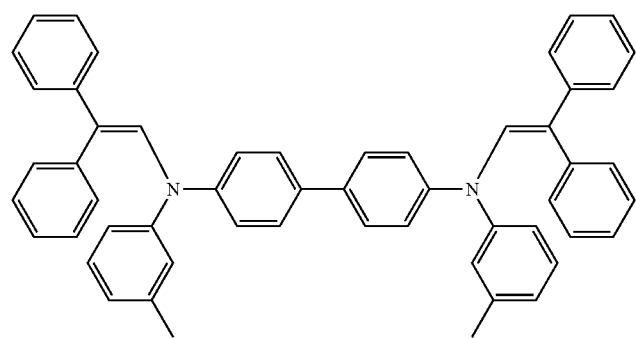
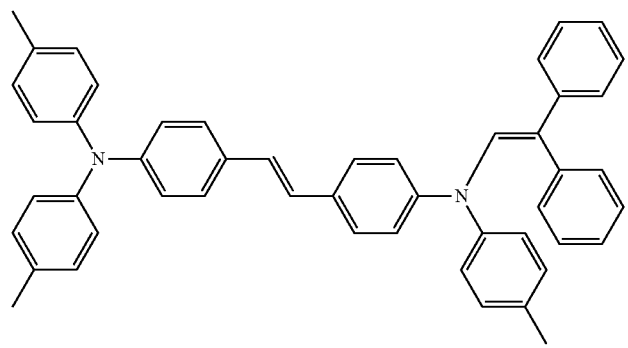
Formula 19
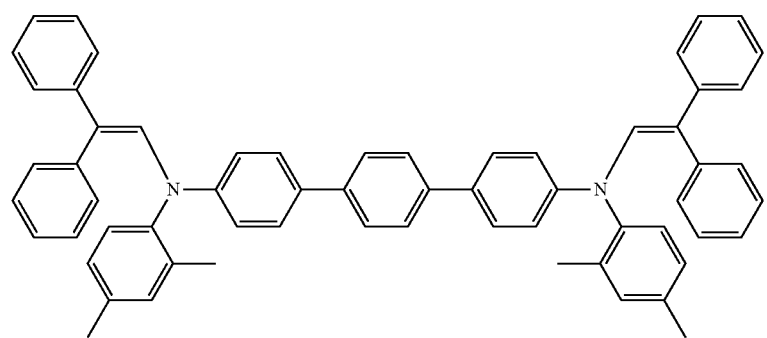

-continued
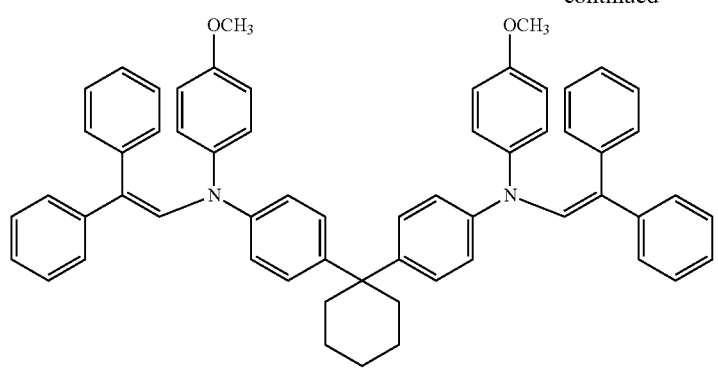
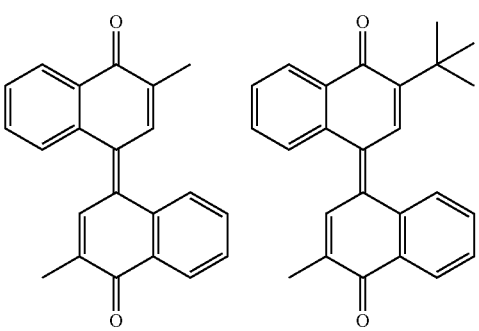
Formula 20
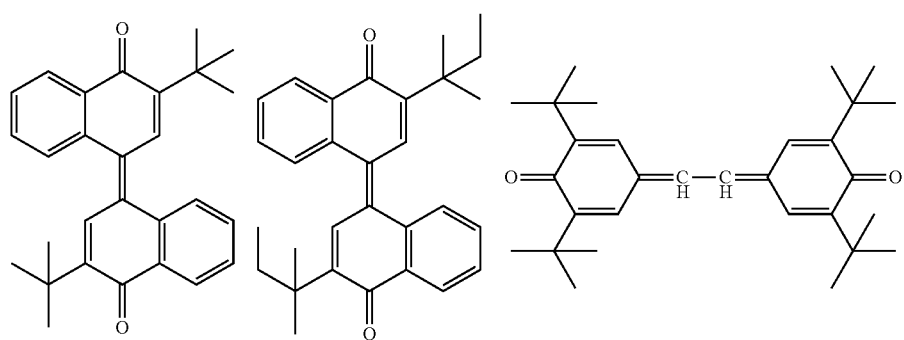
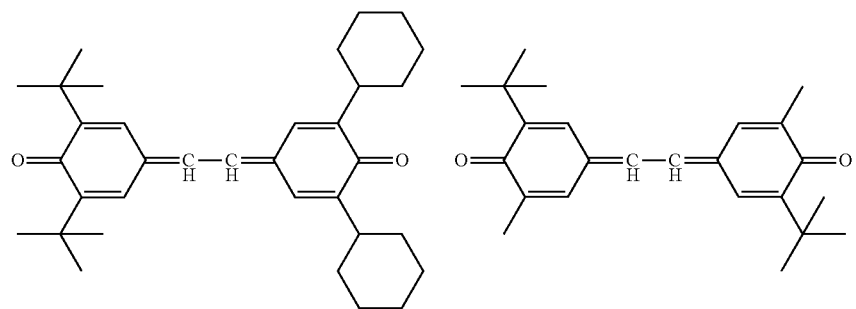
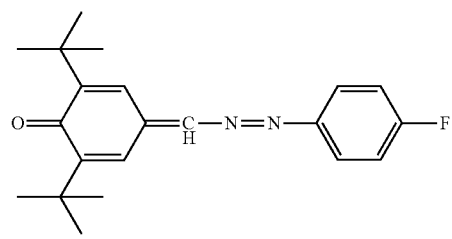
Formula 21
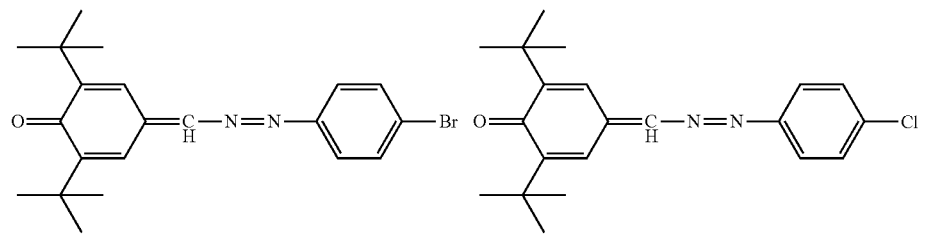

-continued
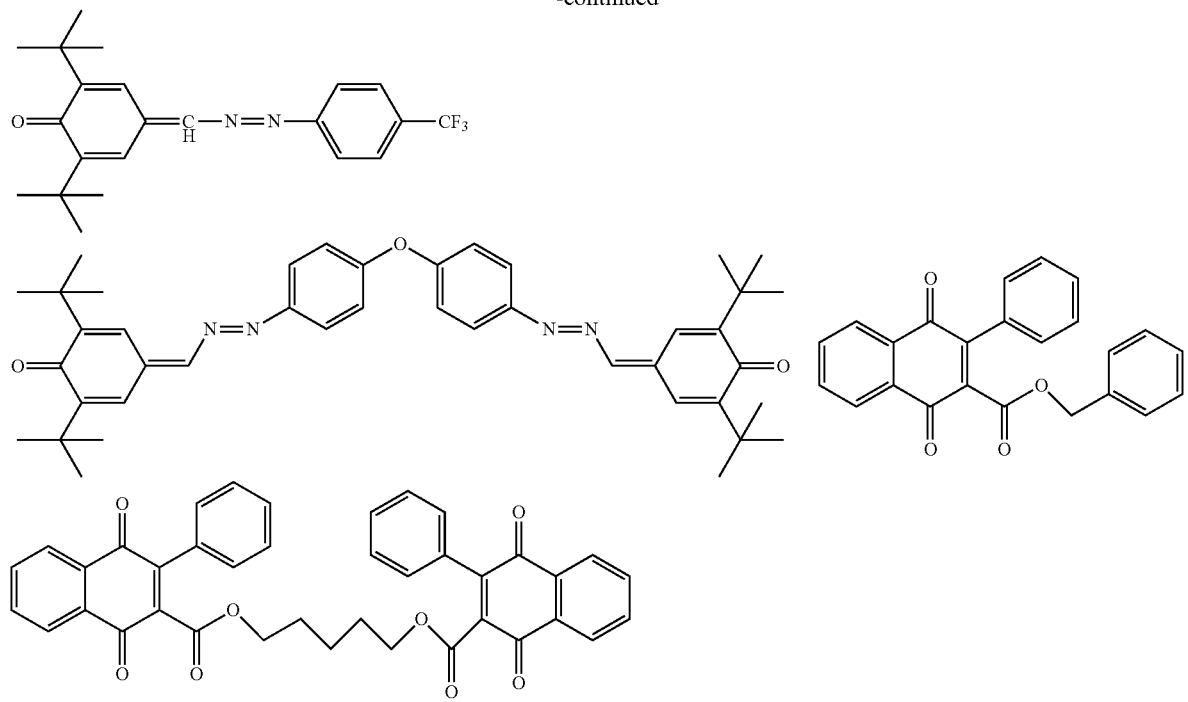
Formula 22
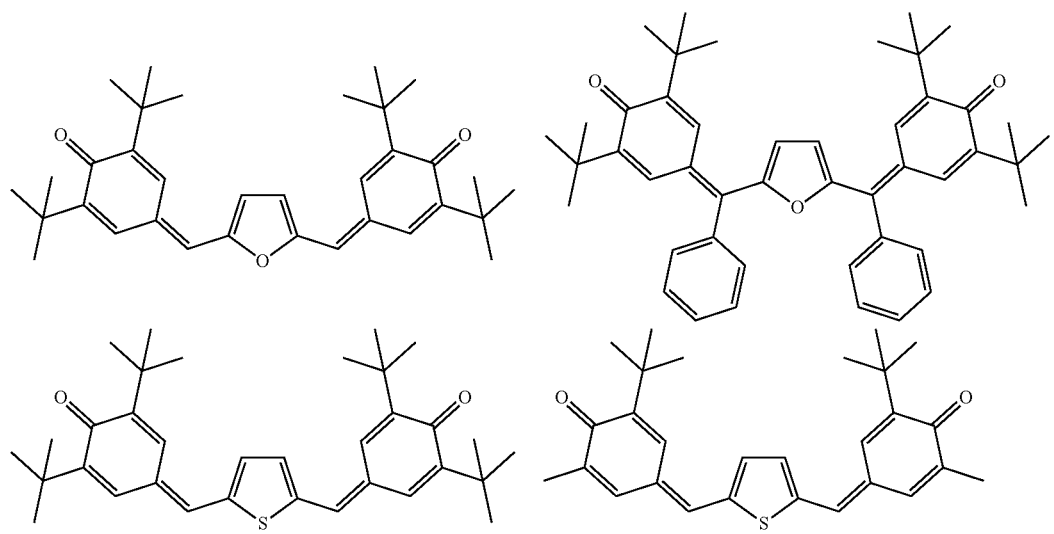
Formula 23
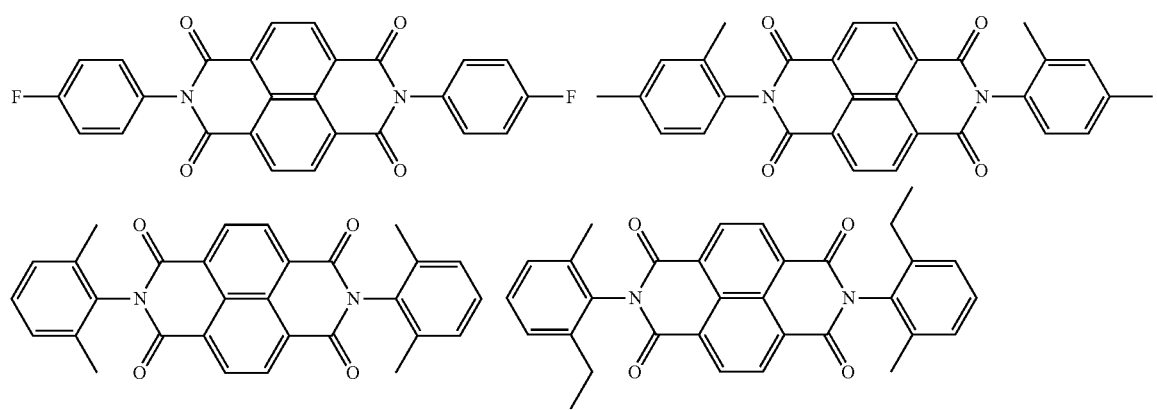

For the above reason, in the electrophotographic photoreceptor according to the exemplary embodiment, the PC resin according to the exemplary embodiment is preferably used as the binder resin in at least one of the charge generating layer or the charge transporting layer.

The electrophotographic photoreceptor according to the exemplary embodiment may be provided with a typically-used undercoat layer between the conductive substrate and the photosensitive layer. Examples of the undercoat layer include: particles such as titanium oxide, aluminum oxide, zirconia, titanic acid, zirconic acid, lanthanum lead, titanium black, silica, lead titanate, barium titanate, tin oxide, indium oxide and silicon oxide; and components such as polyamide resin, phenol resin, casein, melamine resin, benzoguanamine resin, polyurethane resin, epoxy resin, cellulose, cellulose nitrate, polyvinyl alcohol and polyvinyl butyral resin. The resin usable for the undercoat layer may be the above binder resin or the PC resin according to the exemplary embodiment. One of the above particles and resins may be used alone or a plurality thereof may be used in a mixture. When a mixture thereof is used, a combination of inorganic particles and a resin is preferable because a flat and smooth film is favorably formable.

A thickness of the undercoat layer is preferably in a range from 0.01 μm to 10 μm, more preferably in a range from 0.1 μm to 7 μm. The undercoat layer having the thickness of 0.01 μm or more can be formed evenly, while the undercoat layer having the thickness of 10 μm or less can avoid the deterioration in the electrophotographic performance.

The electrophotographic photoreceptor according to the exemplary embodiment may be provided with a typically-used known blocking layer between the conductive substrate and the photosensitive layer. The blocking layer may be made of the same resin as the binder resin. Alternatively, the blocking layer may be made of the PC resin according to the exemplary embodiment. A thickness of the blocking layer is preferably in a range from 0.01 μm to 20 μm, more preferably in a range from 0.1 μm to 10 μm. The blocking layer having the thickness of 0.01 μm or more can be formed evenly, while the blocking layer having the thickness of 20 μm or less can avoid the deterioration in the electrophotographic performance.

The electrophotographic photoreceptor according to the exemplary embodiment may be further provided with a protective layer laminated on the photosensitive layer. The protective layer may be made of the same resin as the binder resin. Alternatively, the protective layer may be made of the PC resin according to the exemplary embodiment. A thickness of the protective layer is preferably in a range from 0.01 μm to 20 μm, more preferably in a range from 0.1 μm to 10 μm in terms of the product performance. The protective layer may contain a conductive material such as the charge generating material, the charge transporting material, an additive, a metal, oxides thereof, nitrides thereof, salts thereof, alloy thereof, carbon black and an organic conductive compound.

In order to enhance performance of the electrophotographic photoreceptor, the charge generating layer and the charge transporting layer may be added with, for instance, a binder, a plasticizer, a curing catalyst, a fluidity adder, a pinhole controller and a spectral-sensitivity sensitizer (sensitizer dye). In addition, in order to prevent increase in residual potential, reduction in charged potential and deterioration of sensitivity after repeated use, various chemical substances and additives such as antioxidant, surfactant, curl inhibitor and leveling agent may be added to the charge generating layer and the charge transporting layer.

Examples of the binders are silicone resin, polyamide resin, polyurethane resin, polyester resin, epoxy resin, polyketone resin, polycarbonate copolymer, polystyrene resin, polymethacrylate resin, polyacrylamide resin, polybutadiene resin, polyisoprene resin, melamine resin, benzoguanamine resin, polychloroprene resin, polyacrylonitrile resin, ethyl cellulose resin, cellulose nitrate resin, urea resin, phenol resin, phenoxy resin, polyvinyl butyral resin, formal resin, vinyl acetate resin, vinyl acetate/vinyl chloride copolymer resin, and polyester carbonate resin. In addition, at least one of a thermosetting resin or a light-curing resin is also usable. The binder is not specifically limited to the above. Any electric-insulating resin from which a film is formable under normal conditions is usable as the binder unless an advantage of the invention is hampered. The binder is preferably used at 80 mass % or less relative to the charge transporting material in terms of the product performance.

Examples of the plasticizer are biphenyl, chlorinated biphenyl, o-terphenyl, halogenated paraffin, dimethylnaphthalene, dimethyl phthalate, dibutyl phthalate, dioctyl phthalate, diethylene glycol phthalate, triphenyl phosphate, diisobutyl adipate, dimethyl sebacate, dibutyl sebacate, laurate butyl, methylphthalyl ethyl glycolate, dimethyl glycol phthalate, methylnaphthalene, benzophenone, polypropylene, polystyrene, and fluorohydrocarbon.

Examples of the curing catalyst are methanesulfonic acid, dodecylbenzenesulfonic acid and dinorylnaphthalene disulfonic acid. Examples of the fluidity adder are Modaflow™ and Acronal 4F™. Examples of the pinhole controller are benzoin and dimethyl phthalate.

The above plasticizer, curing catalyst, fluidity adder and pinhole controller are preferably contained at 5 mass % or less relative to the charge transporting material in terms of the production cost.

When a sensitizer dye is used as a spectral-sensitivity sensitizer, suitable examples of the sensitizer dye includes: triphenylmethane-base dye such as methyl violet, crystal violet, night blue and victoria blue; acridine dye such as erythrosine, Rhodamine B, Rhodamine 3R, acridine orange and frapeosine; thiazine dye such as methylene blue and methylene green; oxazine dye such as capri blue and meldra blue; cyanine dye; merocyanine dye; styryl dye; pyrylium salt dye; and thiopyrylium salt dye, in terms of the production cost and safety.

In order to enhance the sensitivity, reduce the residual potential and reduce fatigue due to repeated use, the photosensitive layer may be added with an electron-accepting material. Preferable examples of the electron-accepting material include compounds having high electron affinity such as succinic anhydride, maleic anhydride, dibromo maleic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic anhydride, tetracyanoethylene, tetracyanoquinodimethane, o-dinitro benzene, m-dinitro benzene, 1,3,5-trinitro benzene, p-nitrobenzonitrile, picryl chloride, quinone chlorimide, chloranil, bromanil, benzoquinone, 2,3-dichloro benzoquinone, dichloro dicyano parabenzoquinone, naphthoquinone, diphenoquinone, tropoquinone, anthraquinone, 1-chloro anthraquinone, dinitro anthraquinone, 4-nitrobenzophenone, 4,4-dinitrobenzophenone, 4-nitrobenzal malonodinitrile, α-cyano-β-(p-cyanophenyl) ethyl acrylate, 9-anthracenyl methylmalonodinitrile, 1-cyano-(p-nitrophenyl)-2-(p-chlorophenyl) ethylene, 2,7-dinitro fluorenone, 2,4,7-trinitro fluorenone, 2,4,5,7-tetranitro fluorenone, 9-fluorenylidene-(dicyano methylene malononitrile), polynitro-9-fluorenylidene-(dicyano methylene malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid. The above compounds may be added to either the charge generating layer or the charge transporting layer. A blending ratio of the compounds is preferably in a range from 0.01 to 200 parts by mass per 100 parts by mass of the charge generating material or the charge transporting material, more preferably in a range from 0.1 to 50 parts by mass in terms of the product performance.

Further, in order to improve surface quality, tetrafluoroethylene resin, trifluoroethylene chloride resin, tetrafluoroethylene hexafluoropropylene resin, vinyl fluoride resin, vinylidene fluoride resin, difluoroethylene dichloride resin, copolymer(s) thereof, fluorine graft polymer and the like may be used. A blending ratio of such surface modifiers is preferably in a range from 0.1 mass % to 60 mass % relative to the binder resin, more preferably in a range from 5 mass % to 40 mass %. At the blending ratio of 0.1 mass % or more, surface modification such as imparting surface durability and reducing surface energy is sufficient. At the blending ratio of 60 mass % or less, deterioration of the electrophotographic performance is avoidable.

Preferable examples of the antioxidant include a hindered phenol antioxidant, aromatic amine antioxidant, hindered amine antioxidant, sulfide antioxidant and organophosphate antioxidant. A blending ratio of the antioxidant is preferably in a range from 0.01 mass % to 10 mass % relative to the charge transporting material, more preferably in a range from 0.1 mass % to 2 mass % in terms of the product performance.

Preferable examples of the antioxidant include the compounds represented by chemical formulae ([Formula 94] to [Formula 101]) disclosed in the Specification of JP 11-172003 A.

One of the above antioxidants may be used alone, or two or more of them may be mixed for use. The above antioxidant may be added to the surface protecting layer, the undercoat layer and the blocking layer in addition to the photosensitive layer.

Specific examples of the solvent used for forming the charge generating layer and the charge transporting layer include: an aromatic hydrocarbon solvent (e.g., benzene, toluene, xylene, and chlorobenzene); ketone (e.g., acetone, methyl ethyl ketone, cyclopentanone, and cyclohexanone); alcohol (e.g., methanol, ethanol and isopropanol), ester (e.g., ethyl acetate, and ethyl cellosolve); halogenated hydrocarbon (e.g., carbon tetrachloride, carbon tetrabromide, chloroform, dichloromethane, and tetrachloroethane); ether (e.g., tetrahydrofuran, dioxolane, and dioxane); and amide (e.g., dimethylformamide, dimethyl sulfoxide, and diethyl formamide). One of the above solvents may be used alone, or two or more thereof may be used together as a mixture solvent.

The photosensitive layer of the single-layer electrophotographic photoreceptor can be easily formed by containing the charge generating material, the charge transporting material and the additive as well as the PC resin of the exemplary embodiment as the binder resin. The charge transporting material is preferably added with at least one of the above-described hole transporting material or electron transporting material in terms of the product performance. Examples of the electron transporting material disclosed in JP 2005-139339 A are preferably usable as the electron transporting material of the exemplary embodiment in terms of the production cost and safety.

Various coating applicators (e.g., known applicators) can perform application of each layer. Examples of such a coating applicator are an applicator, a spray coater, a bar coater, a chip coater, a roll coater, a dip coater and a doctor blade.

A thickness of the photosensitive layer of the electrophotographic photoreceptor is preferably in a range from 5 μm to 100 μm, more preferably in a range from 8 μm to 50 μm. The photosensitive layer having the thickness of 5 μm or more can avoid a reduction in the initial potential, while the photosensitive layer having the thickness of 100 μm or less can avoid the deterioration in the electrophotographic performance. A ratio by mass between the charge generating material and the binder resin used for producing the electrophotographic photoreceptor is preferably 1:99 to 30:70, more preferably 3:97 to 15:85 in terms of the product performance and the production cost. A ratio by mass between the charge transporting material and the binder resin is preferably 10:90 to 80:20, more preferably 30:70 to 70:30 in terms of the product performance and the production cost.

Electrophotographic Device

The electrophotographic photoreceptor according to the exemplary embodiment is preferably usable in an electrophotographic device.

The electrophotographic photoreceptor according to the exemplary embodiment is electrified in use by corona discharge (e.g., corotron, scorotron), contact charging (e.g., charge roll, charge brush) or the like. Examples of the charge roll are a charge roll by DC electrification and a charge roll by AC and DC superimposed electrification. For exposure, a halogen lamp, a fluorescent lamp, laser (semiconductor, He—Ne), LED or a photoreceptor internal exposure system may be used. For image development, for instance, dry developing (e.g., cascade developing, two-component magnetic brush developing, one-component insulating toner developing and one-component conductive toner developing), wet developing and the like may be used. For transfer, for instance, electrostatic transfer (e.g., corona transfer, roller transfer and belt transfer), pressure transfer and adhesive transfer may be used. For fixing, for instance, heat roller fixing, radiant flash fixing, open fixing, and pressure fixing may be used. For washing and neutralizing, brush cleaner, magnetic brush cleaner, electrostatic brush cleaner, magnetic roller cleaner, and blade cleaner may be used. Alternatively, a cleaner-less system may be applied for washing and neutralizing. Examples of a resin for a toner are styrene resin, styrene-acrylic copolymer resin, polyester, epoxy resin and cyclic hydrocarbon polymer. The toner may be spherical or amorphous in shape. The toner may also be controlled to have a certain shape (such as spheroidal shape and potato shape). The toner may be pulverized toner, suspension-polymerized toner, emulsion-polymerized toner, chemically-pelletized toner, or ester-elongation toner.

Modification(s)

It should be understood that the scope of the invention is not limited to the above-described exemplary embodiment(s) but includes modifications and improvements as long as the modifications and improvements are compatible with the invention.

In the first production method of producing the PC resin, the solvent in which the oxygen concentration is equal to or less than one-fifth of the saturated dissolved amount is used at least one of the polymerizing or the washing in order to eliminate or reduce the generation of the colored substance.

However, the colored substance is removable by conducting the washing as an after treatment after the PC resin in a solid form is obtained.

EXAMPLES

Next, examples and comparatives of the invention will be described in detail. However, the invention is not limited to the examples but may include various modifications and applications as long as such modifications and applications do not depart from a technical idea of the invention.

Preparation Example 1: Preparation of Polymer Solution 1

Preparation of Oligomer Solution 1

Nitrogen gas was injected into 2330 g of an ion exchange water to reduce a dissolved oxygen amount to 1.5 mg/L. 66.5 g of sodium hydroxide and 90.6 g of potassium hydroxide were dissolved in the obtained ion exchange water to prepare an alkaline aqueous solution.

116.7 g of 1,1-bis(3-methyl-4-hydroxyphenyl)cyclohexane (BisOCZ) and 55.4 g of 3,3'-dimethyl-4,4'-dihydroxybiphenyl (OCBP) were dissolved in the above prepared alkaline aqueous solution to obtain a solution. The above obtained solution was mixed with 1240 mL of methylene chloride, in which the dissolved oxygen amount was reduced to 1.5 mg/L by injection of nitrogen gas into methylene chloride, to obtain a mixture solution. While being cooled with stirring, the mixture solution was added with 191 g of phosgene for 60 minutes to obtain a reaction solution. Subsequently, the reaction solution was separated while being left still and methylene chloride was distilled under reduced pressure, so that a methylene chloride solution of an oligomer having a chloroformate group at its molecular terminal (solid content concentration: 165 g/L) was obtained. This obtained solution will be referred to as "Oligomer Solution 1" hereinafter.

Preparation of Monomer Solution 1

25 g of 3,3'-dimethyl-4,4'-dihydroxybiphenyl was dissolved in 260 mL of the aqueous sodium hydroxide having an 8 mass % concentration in which the dissolved oxygen amount was reduced to 1.5 mg/L by injection of nitrogen gas, so that Monomer Solution 1 was prepared.

Preparation of Polymer Solution 1

The prepared Oligomer Solution 1 (480 mL) was added with 0.9 g of p-tert-butyl phenol as a molecular weight adjuster and dissolved, subsequently, to which the prepared Monomer Solution 1 was added and mixed to provide a mixture. While being vigorously stirred, the mixture was added with 3 mL of triethylamine aqueous solution having a concentration of 7 mass % as a catalyst. While the mixture was continuously being stirred at a temperature maintained at 10 to 20 degrees C., an interfacial polycondensation reaction was conducted for one hour. After the reaction, the reactant was diluted by 1.5 L of methylene chloride in which the dissolved oxygen amount was reduced to 1.5 mg/L by injection of nitrogen gas. Subsequently, the obtained dilution was washed once with 1.5 L of water in which the dissolved oxygen amount was reduced to 1.5 mg/L by injection of nitrogen gas, twice with 1 L of 0.05N aqueous sodium hydroxide in which the dissolved oxygen amount was reduced to 1.5 mg/L by injection of nitrogen gas, once with 1 L of 0.01N hydrochloric acid, and twice with 1 L of water in this order, so that Polymer Solution 1 was obtained. A resin of the obtained Polymer Solution 1 was a polycarbonate resin (polycarbonate copolymer) having the following structure. In the polycarbonate resin having the following structure, a structure represented by the formula (1) accounted for 50 mol % and a structure represented by the formula (2) accounted for 50 mol %. A viscosity average molecular weight of the resin having the following structure was 55000.

A saturated dissolved oxygen amount in pure water at a temperature of 20 degrees C. was 8.84 mg/L.

Formula 24

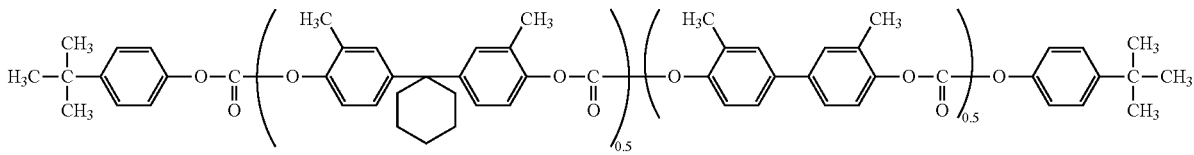

Preparation Example 2: Preparation of Oligomer Solution 2

60.0 kg (224 mol) of 1,1-bis(4-hydroxyphenyl)cyclohexane (bisphenol Z) was suspended in 1080 L of methylene chloride in which the dissolved oxygen amount was reduced to 1.5 mg/L by injection of nitrogen gas. The obtained suspension was added with 66.0 kg (667 mol) of phosgene to be dissolved. To the obtained solution, a solution, which was prepared by dissolving 44.0 kg (435 mol) of triethylamine in 120 L of methylene chloride in which the dissolved oxygen amount was reduced to 1.5 mg/L by injection of nitrogen gas, was dropped at the temperature ranging from 2.2 to 17.8 degrees C. for 2 hours and 50 minutes. After stirring at the temperature ranging from 17.9 to 19.6 degrees C. for 30 minutes, 900 L of methylene chloride was distilled away at the temperature ranging from 14 to 20 degrees C. The residual solution was added and washed with 210 L of pure water in which the dissolved oxygen amount was reduced to 1.5 mg/L by injection of nitrogen gas, 1.2 kg of concentrated hydrochloric acid, and 450 g of hydrosulfite. Subsequently, washing with 210 L of pure water was repeated five times. A methylene chloride solution of a bisphenol Z oligomer having a chloroformate group at its molecular terminal was obtained. The obtained solution had a chloroformate concentration of 1.14 mol/L, a solid concentration of 0.23 kg/L and an average number of repeating units of 1.02. This obtained solution will be referred to as "Oligomer Solution 2" hereinafter.

Preparation Example 3: Preparation of Monomer Solution 2

Nitrogen gas was injected into a 2N aqueous sodium hydroxide to prepare 20 mL of the 2N aqueous sodium hydroxide having 1.5 mg/L of the dissolved oxygen amount. After cooled to or below the room temperature, the 2N aqueous sodium hydroxide was added with 0.1 g of hydrosulfite as an antioxidant and 3.0 g of 3,3'-dimethyl-4,4'-dihydroxybiphenyl. The obtained mixture was fully dissolved to prepare Monomer Solution 2.

Example 1

A reactor was attached with a mechanical stirrer, stirring vane and baffle plate. The Oligomer Solution 2 (24 mL) obtained in Preparation Example 2 and methylene chloride (36 mL) in which the dissolved oxygen amount was reduced to 1.5 mg/L by injection of nitrogen gas were added to the reactor. To the reactor, p-tert-butylphenol (hereinafter abbreviated as PTBP) (0.04 g) as a terminal terminator was added and stirred for a sufficient mixing.

To the obtained solution, all the amount of the Monomer Solution 2 obtained in Preparation Example 3 was added and cooled until an internal temperature of the reactor reached 15 degrees C. After cooled, the obtained mixture was added with 0.2 mL of triethylamine solution (7 vol %) with stirring. The obtained mixture was continuously being stirred for one hour while being kept at a temperature ranging from 15 to 23 degrees C., so that a reaction mixture was obtained.

The obtained reaction mixture was diluted and washed with 0.2 L of methylene chloride in which the dissolved oxygen amount was reduced to 1.5 mg/L by injection of nitrogen gas and 0.1 L of water in which the dissolved oxygen amount was reduced to 1.5 mg/L by injection of nitrogen gas. A lower layer was separated from the reaction mixture. Then, the reaction mixture was further washed once with 0.1 L of 0.05N aqueous sodium hydroxide in which the dissolved oxygen amount was reduced to 1.5 mg/L by injection of nitrogen gas, once with 0.1 L of 0.03N hydrochloric acid, and five times with 0.1 L of water in this order. After washed, the obtained methylene chloride solution was dropped into warm water with stirring. While evaporating methylene chloride, a resin in a solid form was obtained. The obtained resin in a solid form was filtered and then dried to prepare a polycarbonate resin (polycarbonate copolymer) (PC-A) having the following structure.

In the polycarbonate resin (PC-A) having the following structure, the structure represented by the formula (1) accounted for 40 mol % and the structure represented by the formula (2) accounted for 60 mol %.

A saturated dissolved oxygen amount of pure water at a temperature of 23 degrees C. was 8.39 mg/L.

Comparative 1

A PC copolymer (PC-z) was prepared in the same manner as that in Example 1 except for using methylene chloride having 8 mg/L of the dissolved oxygen amount and water having 8 mg/L of the dissolved oxygen amount.

Example 2

A 3-L jacketed reactor was provided with a mechanical stirrer and added with 2 L of a mixture solvent of water: isopropanol (hereinafter, abbreviated as "IPA")=3:2 (ratio by volume). The mixture solvent was heated until an inner temperature thereof reached 70 degrees C. The Polymer Solution 1 (0.2 L) obtained in Preparation Example 1 was dropped into the reactor while being stirred with the mechanical stirrer. Subsequently, methylene chloride evaporated in the reactor was collected with a cooling pipe and distilled from the reactor, so that polymers in flakes were deposited in the reactor. After an inside of the reactor was cooled, the polymers in flakes were taken out and dried, so that a polycarbonate resin (polycarbonate copolymer) (PC-B) in flakes was obtained. A viscosity average molecular weight of the obtained resin was 55000.

Example 3

A 3-L jacketed reactor was provided with a mechanical stirrer, added with 2 L of IPA, and heated until an inner temperature of IPA reached 65 degrees C. The Polymer Solution 1 (0.2 L) obtained in Preparation Example 1 was dropped into the reactor while being stirred with the mechanical stirrer. Subsequently, methylene chloride evaporated in the reactor was collected with a cooling pipe and distilled from the reactor, so that polymers in flakes were deposited in the reactor. After an inside of the reactor was cooled, the polymers in flakes were taken out and dried, so that a polycarbonate resin (polycarbonate copolymer) (PC-C) in flakes was obtained. A viscosity average molecular weight of the obtained resin was 55000.

Example 4

A 3-L jacketed reactor was provided with a mechanical stirrer and added with 2 L of IPA. The Polymer Solution 1 (0.2 L) obtained in Preparation Example 1 was dropped into the reactor while being stirred with the mechanical stirrer, so that polymers in flakes were deposited in the reactor. The obtained polymers in flakes were taken out and dried, so that a polycarbonate resin (polycarbonate copolymer) (PC-D) in flakes was obtained. A viscosity average molecular weight of the obtained resin was 55000.

Formula 25

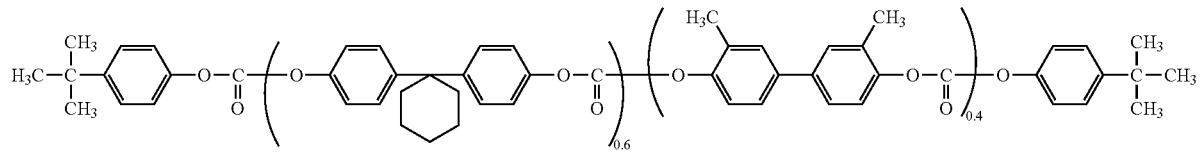

Example 5

A 3-L jacketed reactor was provided with a mechanical stirrer and added with 2 L of acetone. The Polymer Solution 1 (0.2 L) obtained in Preparation Example 1 was dropped into the reactor at the room temperature while being stirred with the mechanical stirrer. The obtained polymers in flakes were taken out and dried, so that a polycarbonate resin (polycarbonate copolymer) (PC-E) in flakes was obtained. A viscosity average molecular weight of the obtained resin was 55000.

Example 6

A 3-L jacketed reactor was provided with a mechanical stirrer, added with the Polymer Solution 1 (0.2 L) obtained in Preparation Example 1, heated with stirring, and condensed while methylene chloride was removed. The condensed contents were transferred onto a tray and heated at the temperature of 80 degrees C. under reduced pressure to remove methylene chloride, so that a dried resin in foam was obtained. The obtained resin was crushed with a mechanical crusher, so that a polycarbonate resin (polycarbonate copolymer) (PC-F) in flakes was obtained. A viscosity average molecular weight of the obtained resin was 55000.

Example 7

A 3-L jacketed reactor was provided with a mechanical stirrer, to which 2 L of IPA and, subsequently, the resin obtained in Example 6 were added. After being stirred with the mechanical stirrer for two hours, the obtained polymers were taken out and dried, so that a polycarbonate resin (polycarbonate copolymer) (PC-G) in flakes was obtained.

Example 8

A 3-L jacketed reactor was provided with a mechanical stirrer and added with 2 L of methanol. The Polymer Solution 1 (0.5 L) obtained in Preparation Example 1 was dropped into the reactor at the room temperature while being stirred with the mechanical stirrer, so that polymers in flakes were deposited in the reactor. The obtained polymers in flakes were taken out and dried, so that a polycarbonate resin (polycarbonate copolymer) (PC-H) in flakes was obtained. A viscosity average molecular weight of the obtained resin became as low as 45000.

Evaluations 1 to 4 described below were conducted on the polycarbonate resins (polycarbonate copolymers) obtained in Examples 1 to 8 and Comparative 1.

Evaluation 1: Measurement of Yellow Index (Yi) of Solid Resin

Each of the resins in flakes was measured in terms of a yellow index (YI) with a spectrophotometric colorimeter in a reflection mode. As the spectrophotometric colorimeter, a spectrophotometric colorimeter SE6000 manufactured by NIPPON DENSHOKU INDUSTRIES Co., LTD. was used. The results are shown in Table 1.

Evaluation 2: Determination of Quinone Content

According to the following methods, a structure of a color-causing substance was determined and a content of the color-causing substance (each of the compounds represented by the formulae (3-1) and (3-2)) was determined. The results are shown in Table 1.

(1) Pretreatment 0.5 g of each of the resins was dissolved in 10 mL of dichloromethane. Subsequently, 30 mL of normal-hexane was dropped into the obtained dichloromethane solution and stirred for 30 minutes. 20 mL of a supernatant of the solution was collected, then condensed and dried. 1 mL of acetonitrile was added to the dried substance. A solid content of the obtained solution was filtered to provide an LCMS/HPLC measurement solution.

(2) LC-MS

Measurement was conducted under the following conditions to determine a structure of a coloring compound (color-causing substance).
Device Name: (LC section) Acquity UHPLC
(MS section) Waters Xevo G2 Q-tof MS
Column: HSS T3 (2.1×100 mm, 1.8 μm)
Mobile phase: A) 2 mM acetate ammonium hydroxide, B) MeCN, C) THF
Gradient
  0 min. A) 30% B) 70% C) 0%
  5 min. A) 30% B) 70% C) 0%
  11 min. A) 5% B) 20% C) 75%
  13 min. A) 30% B) 70% C) 0%
  15 min. A) 30% B) 70% C) 0%
Injected Amount: 1 μl
Flow Rate: 0.5 ml/min.
Detector 1: Quadrupole Time-of-flight Mass Spectrometer, Detection Mode: ESI positive
Detector 2: PDA
Peak 1: Elution Time=0.60 (min) m/z 213.091=dimethyldiphenoquinone+H
Peak 2: Elution Time=0.69 (min) m/z 213.091=dimethyldiphenoquinone+H
Peak 3: Elution Time=0.86 (min) m/z 227.107=triphenyldiphenoquinone+H (3) HPLC A content of each of the compounds at Peaks 1 to 3 obtained in the above (2) was determined based on an analytical curve on which a concentration of a standard substance (3,3',5,5'-tetra-tert-butyldiphenoquinone) was plotted.
Device Name: (LC section) Acquity UHPLC
Column: HSS T3 (2.1×100 mm, 1.8 μm)
Mobile phase: A) H2O, B) MeCN, C) THF
Gradient
  0 min. A) 30% B) 70% C) 0%
  5 min. A) 30% B) 70% C) 0%
  11 min. A) 5% B) 20% C) 75%
  13 min. A) 30% B) 70% C) 0%
  15 min. A) 30% B) 70% C) 0%
Injected Amount: 1 μl
Flow Rate: 0.5 mL/min.
Detector: PDA
Quantitative Analysis: Peak area of integrated chromatograms at wavelengths from 350 to 450 nm The total of the amounts at Peak 1 and Peak 2 obtained in this measurement was calculated as a content (μg/g) of the compound (3-1). The amount at the Peak 3 obtained in this measurement was calculated as a content (μg/g) of the compound (3-2).

Evaluation 3: Measurement of Haze Value 2 g of the resin was dissolved in 18 g of THF. A haze value was measured at 10 mm of an optical path length. The Haze value equal to or less than 5% was evaluated as A. The Haze value more than 5% was evaluated as B. The results are shown in Table 1.

Evaluation 4: Measurement of Residual Potential

Manufacturing of Coating Liquid and Electrophotographic Photoreceptor

An aluminum foil (film thickness: 50 μm) was used as a conductive substrate. A charge generating layer and a charge transporting layer were sequentially laminated on the surface of the conductive substrate to form a laminate photosensitive layer, thereby providing an electrophotographic photoreceptor. 0.5 g of oxotitanium phthalocyanine was used as a charge generating material. 0.5 g of a butyral resin was used as a binder resin. The charge generating material and the binder resin were added into 19 g of methylene chloride (solvent) and dispersed with a ball mill. Then, the dispersion was applied onto the surface of the conductive-substrate film with a bar coater and dried, thereby providing a charge generating layer having a film thickness of approximately 0.5 μm.

Next, for use as a charge transporting material, 0.5 g of a compound represented by the following formula (CTM-1) and 0.5 g of the above resin were dispersed in 10 mL of tetrahydrofuran to prepare a coating liquid. The coating liquid was applied onto the charge generating layer with an applicator and dried, thereby providing a charge transporting layer having a film thickness of approximately 20 μm.

The obtained photoreceptor was pasted over an aluminum drum having a 60-mm diameter. It was confirmed that an electric continuity between the aluminum drum and the photoreceptor was favorably established.

Formula 26

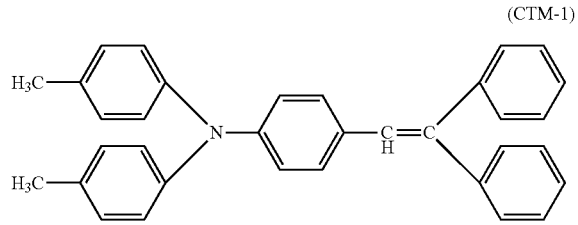

(CTM-1)

Next, an electrophotographic performance of the above-obtained electrophotographic photoreceptor pasted over the aluminum drum was evaluated with an electrostatic charging tester CYNTHIA54IM (manufactured by Gentec Co., Ltd.) in an EV mode and at an initial charging amount being 700 V. It was confirmed that optical attenuation, in which a surface potential was declined due to light radiation, was generated in each of the samples and each of the samples served as the electrophotographic photoreceptor. In this evaluation, a potential at which no change in potential was observed after a sufficient light exposure was evaluated as a "residual potential." The residual potential equal to or less than 50 V was evaluated as C. The residual potential more than 50 V was evaluated as D. The results are shown in Table 1.

TABLE 1

| | Yellow Index | (3-1) Content (μg/g) | (3-2) Content (μg/g) | X + 20xY | Haze Value | Residual Potential |
|---|---|---|---|---|---|---|
| Example 1 | 15 | 85 | 4 | 165 | A | C |
| Example 2 | 6 | 85 | 0.1 | 87 | A | C |
| Example 3 | 2 | 72 | 0.1 | 74 | A | C |
| Example 4 | 8 | 79 | 0.1 | 81 | A | C |
| Example 5 | 3 | 16 | 0.1 | 18 | A | C |
| Example 6 | 15 | 246 | 0.1 | 248 | A | C |
| Example 7 | 11 | 150 | 0.1 | 152 | A | C |
| Example 8 | 9 | 85 | 0.1 | 87 | A | C |
| Comparative 1 | 32 | 50 | 19 | 430 | A | D |

As shown in Table 1, the polycarbonate resins (polycarbonate copolymers) obtained in Examples were found to have the yellow index (YI) of 30 or less and to be less colored.

The invention claimed is:

1. A polycarbonate resin comprising:
   a structure represented by a formula (1), wherein
   the polycarbonate resin in a solid form has a yellow index (YI) of 30 or less,

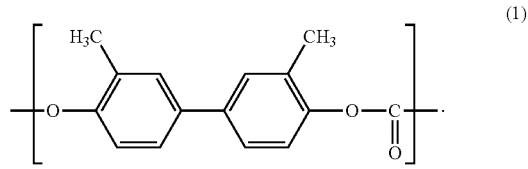

2. The polycarbonate resin according to claim 1, wherein a haze value of a solution in which the polycarbonate resin is dissolved at a concentration of 10 mass % in tetrahydrofuran is equal to or less than 5%.

3. The polycarbonate resin according to claim 1, further comprising: a structure represented by a formula (2) and accounting for from 35 mol % to 75 mol %, wherein
   the structure represented by the formula (1) accounts for from 25 mol % to 65 mol %,

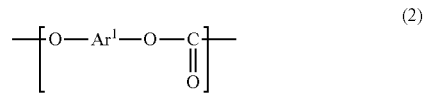

where: $Ar^1$ is a divalent aromatic group not derived from 3,3'-dimethyl-4,4'-dihydroxybiphenyl.

4. The polycarbonate resin according to claim 3, wherein $Ar^1$ in the formula (2) is a divalent group represented by one of formulae (11) to (13),

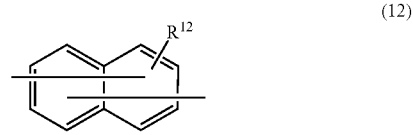

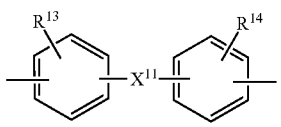

where: in the formulae (11) to (13):
R$^{11}$ to R$^{14}$ are each independently selected from the group consisting of a hydrogen atom, a halogen atom, a trifluoromethyl group, an alkyl group having 1 to 12 carbon atoms, a substituted or unsubstituted aryl group having 6 to 12 carbon atoms, an alkoxy group having 1 to 12 carbon atoms, and a substituted or unsubstituted aryloxy group having 6 to 12 carbon atoms;
a plurality of each of R$^{11}$ to R$^{14}$ are optionally bonded to a single aromatic ring, wherein a plurality of R$^{11}$ are optionally the same group or different groups, a plurality of R$^{12}$ are optionally the same group or different groups, a plurality of R$^{13}$ are optionally the same group or different groups, and a plurality of R$^{14}$ are optionally the same group or different groups;
X$^{11}$ is a single bond or a linking group; when X$^{11}$ is a linking group, the linking group is selected from the group consisting of —O—, —S—, —SO—, —SO$_2$—, —CR$^{15}$R$^{16}$—, a substituted or unsubstituted cycloalkylidene group having 5 to 20 carbon atoms, a substituted or unsubstituted bicyclo-hydrocarbon-diyl group having 5 to 20 carbon atoms, a substituted or unsubstituted tricyclo-hydrocarbon-diyl group having 5 to 20 carbon atoms, a substituted or unsubstituted α,ω-alkylene group having 2 to 12 carbon atoms, a substituted or unsubstituted 9,9-fluorenylidene group, a 1.8-menthanediyl group, a 2,8-menthanediyl group, a substituted or unsubstituted arylene group having 6 to 12 carbon atoms, and α,ω-bis(polyalkylene)dimethylsilyl-polydimethylsiloxy group;
R$^{15}$ and R$^{16}$ are each independently selected from the group consisting of a hydrogen atom, an alkyl group having 1 to 12 carbon atoms, a trifluoromethyl group, and a substituted or unsubstituted aryl group having 6 to 12 carbon atoms.

5. The polycarbonate resin according to claim 1, wherein in the polycarbonate resin, provided that abundance of a compound represented by a formula (3-1) relative to the polycarbonate resin is defined as X (µg/g) and abundance of a compound represented by a formula (3-2) relative to the polycarbonate resin is defined as Y (µg/g), a value of X+20×Y is 400 or less,

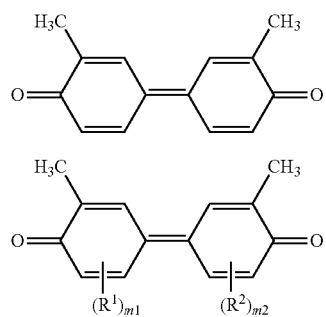

wherein the compounds represented by the formulae (3-1) and (3-2) comprise a cis-compound and a trans-compound in terms of a positional relationship of a methyl group; and
R$^1$ and R$^2$ in the formula (3-2) are each independently a methyl group or a hydroxyl group, m1 is 0 or 1, m2 is 0 or 1, and m1+m2 is 1 or 2.

6. A method of producing the polycarbonate resin according to claim 1 by an interfacial polycondensation method using an alkaline aqueous solution, the method comprising:
polymerizing monomers to obtain polymers; and
washing the polymers obtained in the polymerizing, wherein
both an oxygen concentration in a solvent used in the polymerizing and an oxygen concentration in a solvent used in the washing are equal to or less than one-fifth of a saturated dissolved amount of oxygen.

7. The method according to claim 6, wherein
the polymerizing is conducted in two stages of: polymerizing the monomers to prepare oligomers; and polymerizing the prepared oligomers and monomers to prepare the polymers.

8. The method according to claim 6, wherein the oxygen concentration in at least one of the solvents is 2 mg/L or less.

9. A method of producing the polycarbonate resin according to claim 1, the method comprising:
obtaining a polymer solution comprising polymers and a first solvent; and
mixing the polymer solution only with a second solvent different from the first solvent or mixing the polymer solution with a mixture solvent of the second solvent and water to obtain the polycarbonate resin in a solid form, wherein
methanol is not used as a sole component or a main component of the second solvent.

10. The method according to claim 9, wherein
the second solvent used in obtaining the polycarbonate resin in a solid form is a poor solvent against the polymers.

11. The method according to claim 9, wherein
the second solvent used in obtaining the polycarbonate resin in a solid form is a poor solvent against the polymers, and
the polycarbonate resin in a solid form is obtained with use of a difference in solubility of the polymers by heating a mixture solution of the polymer solution only with the second solvent or a mixture solution of the polymer solution with the mixture solvent of the second solvent and water to reach at least a boiling point of the first solvent to distill the first solvent from the mixture solution.

12. The method according to claim 9, wherein
the second solvent comprises at least one selected from the group consisting of ethanol, 1-propanol, 2-propanol, 1-butanol, 2-butanol, isobutanol, t-butanol, acetone, methyl ethyl ketone, a solvent containing hydrocarbon having 5 to 8 carbon atoms as a main component, heptane and toluene.

13. A method of producing a polycarbonate resin comprising a structure represented by a formula (1) by an interfacial polycondensation method using an alkaline aqueous solution, the method comprising:
polymerizing monomers to obtain polymers; and
washing the polymers obtained in the polymerizing, wherein
both an oxygen concentration in a solvent used in the polymerizing and an oxygen concentration in a solvent used in the washing are equal to or less than one-fifth of a saturated dissolved amount of oxygen,

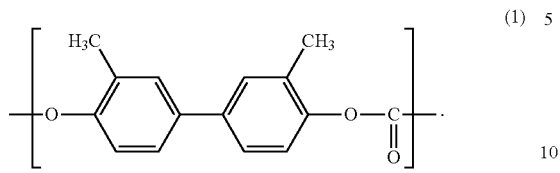

(1)

14. The method according to claim 13, wherein the polymerizing is conducted in two stages of: polymerizing the monomers to prepare oligomers; and polymerizing the prepared oligomers and monomers to prepare the polymers.

15. A polycarbonate resin produced by the method according to claim 13.

16. A coating liquid comprising the polycarbonate resin according to claim 1.

17. An electrophotographic photoreceptor comprising a photosensitive layer comprising the polycarbonate resin according to claim 1.

18. An electrophotographic device comprising the electrophotographic photoreceptor according to claim 17.